United States Patent
Eriksson

(10) Patent No.: US 11,647,415 B2
(45) Date of Patent: May 9, 2023

(54) HANDLING DELAY BUDGET IN A WIRELESS COMMUNICATION SYSTEM

(71) Applicant: Telefonaktiebolaget LM Ericsson (publ), Stockholm (SE)

(72) Inventor: Per-Erik Eriksson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 116 days.

(21) Appl. No.: 16/965,169

(22) PCT Filed: Jun. 11, 2019

(86) PCT No.: PCT/SE2019/050551
§ 371 (c)(1),
(2) Date: Jul. 27, 2020

(87) PCT Pub. No.: WO2019/240657
PCT Pub. Date: Dec. 19, 2019

(65) Prior Publication Data
US 2020/0367094 A1     Nov. 19, 2020

Related U.S. Application Data

(60) Provisional application No. 62/685,710, filed on Jun. 15, 2018.

(51) Int. Cl.
*H04W 28/02*     (2009.01)
*H04W 40/22*     (2009.01)
(Continued)

(52) U.S. Cl.
CPC ... *H04W 28/0268* (2013.01); *H04W 28/0278* (2013.01); *H04W 40/22* (2013.01); *H04W 72/10* (2013.01); *H04W 72/1242* (2013.01)

(58) Field of Classification Search
CPC ......... H04W 28/0268; H04W 28/0278; H04W 40/22; H04W 72/10; H04W 72/1242; H04W 40/02; H04W 28/02
See application file for complete search history.

(56) References Cited

U.S. PATENT DOCUMENTS 9,923,836 B1 *  3/2018  Vivanco .............. H04L 47/2475
2006/0112168 A1 *  5/2006  Albers ................. H04L 47/263
                                                                    709/213
(Continued)

FOREIGN PATENT DOCUMENTS

WO        2016049176 A1      3/2016

OTHER PUBLICATIONS

PCT International Search Report and Written Opinion dated Sep. 25, 2019 for International Application PCT/SE2019/050551, 11 pages.

(Continued)

*Primary Examiner* — Dinh Nguyen
(74) *Attorney, Agent, or Firm* — Sage Patent Group

(57) ABSTRACT

A radio network node receives a data block to be transmitted by the radio network node towards a destination node. The data block is received over an upstream wireless backhaul from an upstream radio network node and/or is to be transmitted towards the destination node over a downstream wireless backhaul to a downstream radio network node. The radio network node determines a remaining delay budget that indicates a remaining portion of a delay budget for the data block to reach the destination node. The radio network node makes a decision about how or whether to transmit the data block, based on the remaining delay budget.

17 Claims, 21 Drawing Sheets

(51) Int. Cl.
*H04W 72/10* (2009.01)
*H04W 72/12* (2009.01)

(56) References Cited

U.S. PATENT DOCUMENTS

| | | | | |
|---|---|---|---|---|
| 2010/0278140 | A1* | 11/2010 | Smith | H04J 3/0658 370/331 |
| 2015/0049664 | A1* | 2/2015 | Gora | H04W 28/021 370/315 |
| 2015/0244635 | A1* | 8/2015 | Orten | H04W 4/70 370/230 |
| 2015/0327169 | A1* | 11/2015 | Nigam | H04W 52/0209 370/311 |
| 2015/0334031 | A1 | 11/2015 | Vasseur et al. | |
| 2016/0285720 | A1* | 9/2016 | Maenpaa | H04L 67/10 |
| 2017/0005913 | A1* | 1/2017 | Hampel | H04L 45/245 |
| 2017/0078209 | A1* | 3/2017 | Miklos | H04W 28/0284 |
| 2019/0166640 | A1* | 5/2019 | Wei | H04W 72/1252 |
| 2019/0297487 | A1* | 9/2019 | Munoz Sanchez | H04W 8/20 |

OTHER PUBLICATIONS

KDDI Corporation, 3GPP TSG-RAN R2-1800569, "Requirements for IAB", 11.1 Study on Integrated Access and Backhaul for NR, Vancouver, Canada, Jan. 22-26, 2018, 2 pages.
LG Electronics Inc., 3GPP TSG-RAN WG2 Meeting #101bis, R2-1808551, "Consideration on route selection", Busan, Korea, May 21-25, 2018, 3 pages.
Technical Specification Group Services and System Aspects, System Architecture for the 5G System, Stage 2 (Release 15), 3GPP TS 23.501 V15.5.0 (Mar. 2019), Valbonne, France, 241 pages.
Extended European Search Report for European Patent Application No. 19819663.6 dated Feb. 10, 2022, 10 pages.
LG Electronics Inc., 3GPP TSG-RAN WG2 Meeting #101 bis, R2-1805872, "Consideration on Route Selection", Sanya, China, Apr. 16-20, 2018, 3 pages, XP051416230.

* cited by examiner

HANDLING DELAY BUDGET IN A WIRELESS COMMUNICATION SYSTEM

CROSS-REFERENCE TO RELATED APPLICATIONS

This application is a 35 U.S.C. § 371 national stage application for International Application No. PCT/SE2019/050551, entitled "HANDLING DELAY BUDGET IN A WIRELESS COMMUNICATION SYSTEM", filed on Jun. 11, 2019, which claims priority to U.S. Provisional Patent Application No. 62/685,710, filed on Jun. 15, 2018, the disclosures and contents of which are hereby incorporated by reference in their entireties.

TECHNICAL FIELD

The present application relates generally to a wireless communication system, and relates more particularly to handling of a delay budget in such a system.

BACKGROUND

Integrated Access Backhaul (IAB) is the concept used in the $3^{rd}$ generation partnership project (3GPP) to describe a system for New Radio (NR) self-backhauling. In contrast to traditional backhaul approaches where a donor node in the radio access network (RAN) connected to another RAN node over a wireline backhaul, e.g., via fiber or cable, the donor node in IAB connects to one or more other RAN nodes over a wireless backhaul. This wireless backhaul may exist over one or more hops between RAN nodes. The donor node and the other RAN nodes backhauled from the RAN node also provide access to ordinary user equipments (UEs). An IAB system is therefore capable of being a multi-hop system. In a half duplexing operation, the RAN node is not transmitting and receiving at the same time, in order to avoid self-interference.

FIG. 1 shows the basic principle for an IAB system. In FIG. 1, a gNB 1 is functionally split into a Centralized Unit (CU) 1A and a Distributed Unit (DU) 1B. The CU 1A contains the packet data convergence protocol (PDCP) and above, and may be connected via fiber 2 to a core network, e.g., a 5G Core (5GC). The DU 1B contains the Radio Link Control (RLC), Medium Access Control (MAC), and Physical Layer (PHY) protocols. The DU 1B may be connected via radio access 3 to one or more UEs 4. The gNB 1 as an IAB donor node is connected to an IAB node 5-1 over a wireless backhaul 6-1. The IAB node 5-1 includes a Mobile Termination (MT) 5-1A that provides UE functionality in the IAB node. The IAB node 5-1 also includes a DU 5-1B and provides access 3 to one or more UEs 4. The IAB node 5-1 as shown is in turn connected via a wireless backhaul 6-2 to another IAB node 5-2. IAB node 5-2 similarly includes an MT 5-2A providing UE functionality as well as a DU 5-2B for providing access 3 to one or more UEs 4. Finally, the IAB node 5-2 is in turn connected via a wireless backhaul 6-3 to another IAB node 5-3. IAB node 5-3 similarly includes an MT 5-3A providing UE functionality as well as a DU 5-3B for providing access 3 to one or more UEs 4.

Wireless backhauling via such an IAB system advantageously enables simple and cost-effective network deployment, without reliance on the availability of wired backhaul at each access node location. However, the multi-hop nature of an IAB system threatens to delay packets traversing the system for longer than allowed for some services that require a certain quality of service.

SUMMARY

Some embodiments herein exploit knowledge of how much of a delay budget remains at a certain point in a data block's transmission path, in order to control or otherwise influence decisions about how or if to transmit the data block towards its destination. For example, if only a relatively small portion of the delay budget remains given a radio network node's position in the transmit path, the radio network node may make decision(s) that effectively expedite delivery of the data block to the destination more so than would have otherwise occurred. Or, if the remaining portion of the delay budget is so small that delivery within the budget is unlikely or impossible, the radio network node may simply drop the data block, e.g., to prompt its retransmission or to accept its loss. On the other hand, if a relatively large portion of the delay budget remains given the radio network node's position in the transmit path, the radio network node may make decision(s) that effectively slow delivery of the data block to the destination more so than would have otherwise occurred, e.g., in order to free up transmission resources for other data blocks with less delay budget remaining. Some embodiments herein may thereby advantageously facilitate delivery of data blocks in accordance with delay budget requirements or expectations, even in systems that employ wireless backhauls. This may contribute to ensuring the overall QoS requirements or expectations for data block delivery, e.g., so as to reduce user waiting time.

More particularly, embodiments herein include a method performed by a radio network node. The method comprises receiving a data block to be transmitted by the radio network node towards a destination node. The data block is received over an upstream wireless backhaul from an upstream radio network node and/or is to be transmitted towards the destination node over a downstream wireless backhaul to a downstream radio network node. The method may also comprise determining a remaining delay budget that indicates a remaining portion of a delay budget for the data block to reach the destination node. The method may further comprise making a decision about how or whether to transmit the data block, based on the remaining delay budget.

In some embodiments, making the decision for the data block comprises deciding, based on the remaining delay budget, one or more of: whether or not to drop the data block; a modulation and coding scheme with which to schedule the data block for transmission from the radio network node; which one or more transmission resources to allocate for transmission of the data block; which of multiple possible routes to the destination node the data block is to be transmitted over; whether the data block is to be preempted by, or is to preempt, another data block in a transmit buffer of the radio network node; or a priority or timeliness with which the data block is to be transmitted from the radio network node.

In some embodiments, the method may further comprise transmitting the data block from the radio network node in accordance with the decision.

In some embodiments, the decision for the data block is made further based on expected delay that includes delay expected to be incurred after transmitting the data block from the radio network node. In some embodiments, the expected delay includes one or more of: propagation delay expected to be incurred after transmitting the data block from the radio network node; or time duplexing delay expected to be incurred after transmitting the data block from the radio network node, wherein the time duplexing delay includes delay attributable to wireless backhaul transmissions being duplexed in time with access link transmissions.

In some embodiments, the data block is received from an upstream node. In this and other embodiments, the method may further comprise receiving from the upstream node control signaling indicating an upstream delay that includes delay incurred up until when the upstream node transmitted the data block to the radio network node. The method may further comprise determining upstream propagation delay that includes propagation delay between the upstream node and the radio network node, and determining a self time delay that is a delay between a receive time when the data block passes a receive reference point in a receive chain of the radio network node and a scheduling time when the data block is available to be scheduled by the radio network node for transmission. In some embodiments, then, the method may comprise calculating a cumulative time delay as a sum of a least the upstream delay, the upstream propagation delay, and the self time delay. The remaining delay budget may then be calculated by subtracting the cumulative time delay from the delay budget. In one embodiment, the method further comprises receiving control signaling indicating the upstream propagation delay.

Embodiments herein also include another method performed by a radio network node. The method comprises receiving a data block to be transmitted by the radio network node towards a destination node, wherein the data block is received over an upstream wireless backhaul from an upstream radio network node and/or is to be transmitted towards the destination node over a downstream wireless backhaul to a downstream radio network node. The method may also comprise transmitting the data block from the radio network node towards the destination node, as well as transmitting towards the destination node control signaling that indicates a time delay between a reference time and a transmit time when the data block passes a transmit reference point in a transmit chain of the radio network node.

In some embodiments, the control signaling also indicates a delay budget for the data block to reach the destination node.

In some embodiments, the reference time is a time from which a delay budget for the data block to reach the destination node is measured.

In some embodiments, the reference time is a receive time when the data block passes a receive reference point in a receive chain of the radio network node.

In some embodiments, the data block is received from an upstream node. In this and other embodiments, the method may further comprise receiving from the upstream node control signaling indicating an upstream delay that includes delay incurred between the reference time and a time when the upstream node transmitted the data block to the radio network node. The method may also comprise determining upstream propagation delay that includes propagation delay between the upstream node and the radio network node, and determining a self time delay that is a delay between a receive time when the data block passes a receive reference point in a receive chain of the radio network node and the transmit time, and wherein the time delay is determined based on the self time delay. In this case, the method may also comprise calculating the time delay as a sum of at least the indicated upstream delay, the upstream propagation delay, and the self time delay.

In some embodiments, the method further comprises receiving control signaling indicating the upstream propagation delay.

In any of the above methods, the data block may be a packet, and the delay budget may be a packet delay budget, PDB. Alternatively, the data block may be a transport block that carries data from one or more packets.

In any of the above methods, the method may further comprise receiving control signaling indicating the delay budget.

In any of the above methods, the radio network node may be an integrated access backhaul, IAB, node in a New Radio wireless communication system.

Embodiments herein also include a method performed by a network node. The method comprises estimating, for each of one or more pairs of radio network nodes, a propagation delay over a wireless backhaul between the radio network nodes of the pair. The method further comprises transmitting to one or more radio network nodes control signaling indicating the estimated propagation delay for each of the one or more pairs of radio network nodes.

In some embodiments, the one or more pairs of radio network nodes comprise one or more pairs of integrated access backhaul, IAB, nodes in a New Radio wireless communication system.

In some embodiments, the network node is an integrated access backhaul, IAB, donor node in a New Radio wireless communication system.

Embodiments further include corresponding apparatus, computer programs, and carriers. For example, embodiments include a radio network node. The radio network node is configured, e.g., via communication circuitry and processing circuitry, to receive a data block to be transmitted by the radio network node towards a destination node. The data block is received over an upstream wireless backhaul from an upstream radio network node and/or is to be transmitted towards the destination node over a downstream wireless backhaul to a downstream radio network node. The radio network node may further be configured to determine a remaining delay budget that indicates a remaining portion of a delay budget for the data block to reach the destination node. The radio network node may also be configured to make a decision about how or whether to transmit the data block, based on the remaining delay budget.

Embodiments moreover include a radio network node. The radio network node is configured, e.g., via communication circuitry and processing circuitry, to receive a data block to be transmitted by the radio network node towards a destination node, wherein the data block is received over an upstream wireless backhaul from an upstream radio network node and/or is to be transmitted towards the destination node over a downstream wireless backhaul to a downstream radio network node. The radio network node may also be configured to transmit the data block from the radio network node towards the destination node, as well as to transmit towards the destination node control signaling that indicates a time delay between a reference time and a transmit time when the data block passes a transmit reference point in a transmit chain of the radio network node.

Embodiments also include a network node. The network node is configured, e.g., via communication circuitry and processing circuitry, to estimate, for each of one or more pairs of radio network nodes, a propagation delay over a wireless backhaul between the radio network nodes of the pair. The network node is further configured to transmit to one or more radio network nodes control signaling indicating the estimated propagation delay for each of the one or more pairs of radio network nodes.

DETAILED DESCRIPTION

Figure 2:
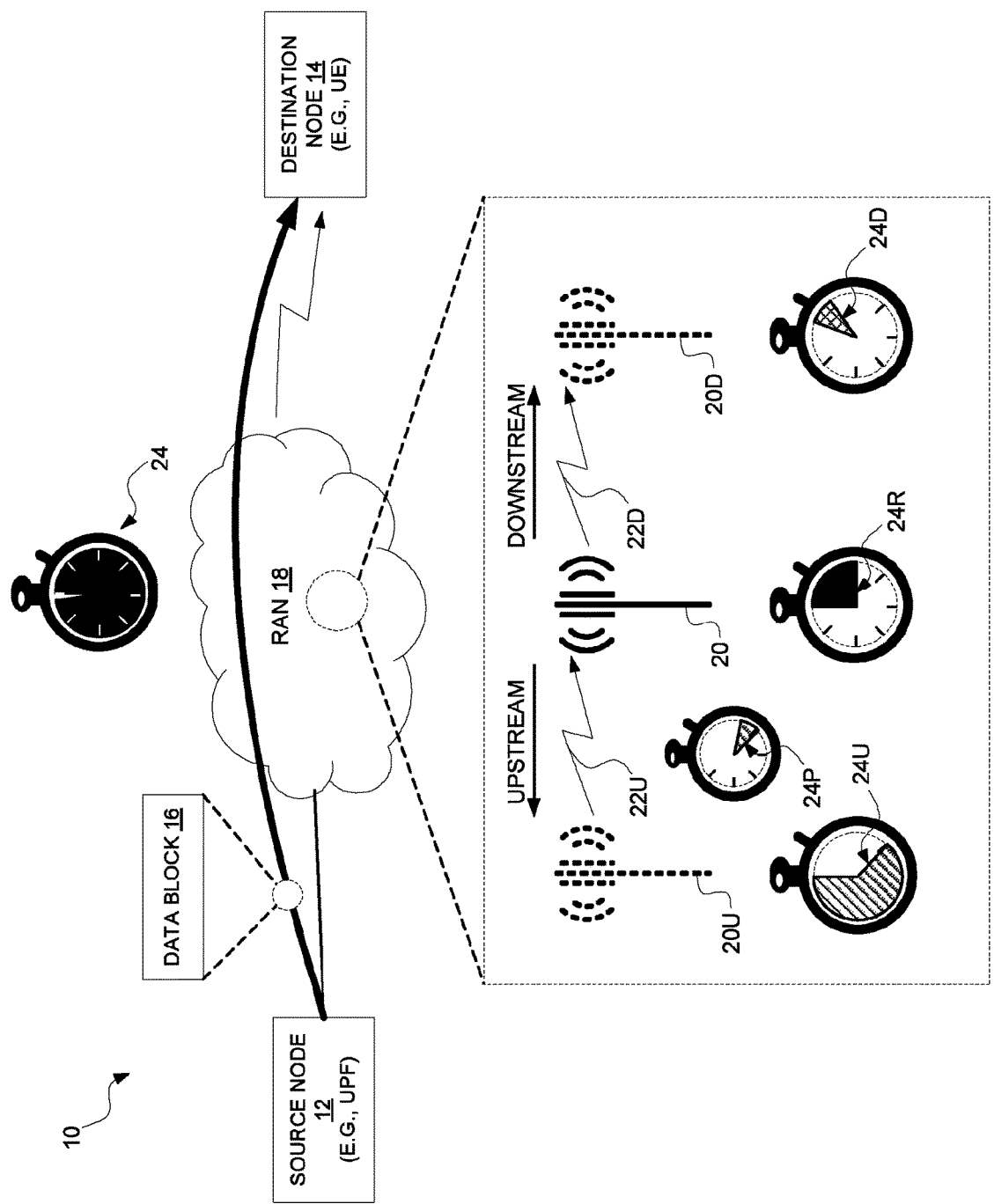
FIG. 2 is a block diagram of a wireless communication system according to some embodiments.

FIG. 2 shows a wireless communication system 10 according to some embodiments. The wireless communication system 10 includes a source node 12 and a destination node 14. The source node 12 transmits a data block 16, e.g., a packet or a transport block, to the destination node 14. In some embodiments, the source node 12 is a network node, e.g., such as a core network node implementing a user plane function (UPF), and the destination node 14 is a wireless communication device, e.g., a user equipment (UE). In these embodiments, then, the data block 16 is a downlink data block transmitted in a downlink direction. In other embodiments, the source node 12 is a wireless communication device and the destination node 14 is a network node, e.g., in the core network of the system 10, such that the data block 16 is an uplink data block transmitted in an uplink direction.

Regardless of whether the data block 16 is transmitted in the uplink or downlink, FIG. 2 shows that the data block 16 is transmitted via a radio access network (RAN) 18. The RAN 18 includes multiple radio network nodes that effectively relay or forward the data block 16 towards the destination node 14, e.g., in a multi-hop fashion. At least some of the radio network nodes exploit a wireless backhaul between the radio network nodes in order to relay or forward the data block 16. FIG. 2 for example shows that a radio network node 20 may receive the data block 16 from an upstream radio network node 20U over an upstream wireless backhaul 22U. "Upstream" here refers to a direction that from the perspective of radio network node 20 is towards the source node 12, e.g., on a path or route that the data block 16 takes. Alternatively or additionally, the radio network node 20 may transmit the data block 16 towards the destination node 14 over a downstream wireless backhaul 22D to a downstream radio network node 20D, "Downstream" here refers to a direction that from the perspective of radio network node 20 is towards the destination node 14, e.g., on a path or route that the data block 16 takes. In an embodiment where the system 10 is a 5G system, the radio network node 20 may be an integrated access backhaul (IAB) donor or an IAB node.

Relaying or forwarding the data block 16 towards the destination node 14 in this way incurs delay in delivering the data block 16 to the destination node 14, at least some of which may be exacerbated by or attributable to the wireless nature of the backhaul between radio network nodes. A delay budget 24 in this regard governs how much delay, e.g., between 5 ms and 300 ms, is budgeted for the data block 16 to reach the destination node 14, e.g., in accordance with quality of service (QoS) requirements or expectations at the destination node 14. In some embodiments where the data block 16 is a packet, for instance, the delay budget 24 may take the form of a packet delay budget (PDB), e.g., as defined in 3GPP Technical Specification 23.501 v. 15.1.0. Regardless, each hop or segment on the path that the data block 16 traverses on its way to the destination node 14 consumes at least some of that delay budget 24, e.g., due to propagation delay, radio network node processing delay, delay caused by having to wait for radio resources to become available, etc.

Some embodiments herein exploit knowledge of how much of the delay budget 24 remains at a certain point in the data block's transmission path, in order to control or otherwise influence decisions about how or if to transmit the data block 16 towards the destination node 14. For example, if only a relatively small portion of the delay budget 24 remains given a radio network node's position in the transmit path, the radio network node may make decision(s) that effectively expedite delivery of the data block 16 to the destination node 16 more so than would have otherwise occurred. Or, if the remaining portion of the delay budget 24 is so small that delivery within the budget 24 is unlikely or impossible, the radio network node may simply drop the data block 16, e.g., to prompt its retransmission or to accept its loss. On the other hand, if a relatively large portion of the delay budget 24 remains given the radio network node's position in the transmit path, the radio network node may make decision(s) that effectively slow delivery of the data block 16 to the destination node 16 more so than would have otherwise occurred, e.g., in order to free up transmission resources for other data blocks with less delay budget remaining. Some embodiments herein may thereby advantageously facilitate delivery of data blocks in accordance with delay budget requirements or expectations, even in systems that employ wireless backhauls. This may contribute to ensuring the overall QoS requirements or expectations for data block delivery, e.g., so as to reduce user waiting time.

More particularly, in FIG. 2, the radio network node 20 receives the data block 16 to be transmitted by the radio network node 20 towards the destination node 14. The data block 16 may be received for instance over the upstream wireless backhaul 22U from the upstream radio network node 20U. Alternatively or additionally, the data block 16 is to be transmitted towards the destination node 14 over the downstream wireless backhaul 22D to the downstream radio network node 20D. In any event, the radio network node 20 determines a remaining delay budget 24R that indicates a remaining portion of the delay budget 24 for the data block 16 to reach the destination node 14.

In some embodiments, the remaining delay budget 24R is absolute in that it absolutely indicates the portion of time remaining in the delay budget 24. In other embodiments, the remaining delay budget is relative in that it indicates the portion of time remaining in the delay budget 24 relative to a reference portion. The reference portion may be for instance a portion of delay budget deemed sufficient, e.g., under normal conditions, for delivery of the data block 16 from the radio network node 20 to the destination node 14 within the delay budget 24, e.g., given the radio network node's position in the transmit path of the data block 16 and without the radio network node 20 having to expedite delivery. The remaining delay budget 24R in this case may indicate the extent to which the radio network node 20 has a surplus or deficit of remaining delay budget, compared to a reference or threshold amount of remaining delay budget.

No matter the particular form of the remaining delay budget 24R, the radio network node 20 uses that remaining delay budget 24R in making a decision about how or if to transmit the data block 16 towards the destination node 14. For example, in some embodiments, the radio network node 20 makes a scheduling decision for the data block 16 based on the remaining delay budget 24R. In these and other embodiments, making the decision may entail deciding, based on the remaining delay budget 24R, (i) whether or not to drop the data block 16; (ii) a modulation and coding scheme with which to schedule the data block 16 for transmission from the radio network node 20; (iii) which one or more transmission resources, e.g., radio resources in time, frequency, code, spatial, etc., to allocate for transmission of the data block 16; (iv) which of multiple possible routes to the destination node 14 the data block 16 is to be transmitted over; (v) whether the data block 16 is to be preempted by, or is to preempt, another data block in a transmit buffer of the radio network node 20; (vi) a priority or timeliness with which the data block 16 is to be transmitted from the radio network node 20; and/or (vii) one or more transmit parameters for transmission of the data block 16. For example, if the remaining delay budget 24R suggests that compliance with the delay budget 24 is in jeopardy, the radio network node 20 may allocate more transmission resources to the data block's transmission, may schedule the data block 16 to be transmitted more quickly from the radio network node such as by having the data block 16 preempt another data block in the transmit buffer, and/or otherwise promote the data block 16 to having a higher priority for transmission. In fact, in some embodiments, the radio network node 20 makes this decision with different outcomes for different amounts of remaining delay budget 24R, e.g., according to a mapping or association between different amounts of remaining delay budget 24R and different respective decision outcomes. No matter the particular nature of the decision, though, the radio network node 20 in making that decision may effectively control the delay with which the radio network node 20 relays or forwards the data block 16, as needed for compliance with the delay budget 24.

Note that, in some embodiments, the radio network node 20 makes the decision, e.g., in the form of a scheduling decision, based on the remaining delay budget 24R instead of or in addition to the delay budget 24 itself. Indeed, the delay budget 24 itself may inherently and/or statically indicate how quickly the data block 16 needs to reach the destination node 14, e.g., for higher QoS, so as to suggest certain treatment of the data block 16 by the radio network node 20. But the radio network node 20 may alternatively or additionally exploit the remaining delay budget 24R as a more specific and/or dynamic indicator of how the radio network node in particular is to treat the data block 16. Indeed, the remaining delay budget 24R more specifically represents the radio network node's unique position in the transmit chain and/or dynamically accounts for actual delays incurred upstream in the transmit chain.

Moreover, in some embodiments, the radio network node 20 makes the decision, e.g., in the form of a scheduling decision, based both on the remaining delay budget 24R and on delay expected to be incurred after transmitting the data block 16 from the radio network node 20; that is, a delay that the radio network node 20 expects to be incurred downstream of the radio network node 20. FIG. 2 for instance shows that a delay 24D is expected to be incurred downstream of the radio network node 20.

The expected delay 24D may for instance include propagation delay expected to be incurred, e.g., as indicating by control signaling received at the radio network node 20 and/or as estimated by the radio network node 20. Such propagation delay may include the propagation delay expected to be incurred over one or more hops remaining in a transmit path to the destination node 14, e.g., the cumulative propagation delay over some or all of the remaining hops in the transmit path. The expected delay 24D may for example include the delay expected due to the propagation of the data block 16 over the downstream wireless backhaul 22D to downstream radio network node 20D.

Alternatively or additionally, the expected delay 24D includes time duplexing delay expected to be incurred after transmitting the data block 16 from the radio network node 20. This time duplexing delay may include delay attributable to wireless backhaul transmissions being duplexed in time with access link transmissions, i.e., transmissions on an access link to wireless communication devices. In some embodiments, the expected delay 24D alternatively or additionally includes estimated or default processing time expected at one or more downstream radio network nodes.

In these and other cases, then, the expected delay 24D may account for how many more hops occur after the radio network node 20 in the route or path to the destination node 14. In some embodiments, the radio network node 20 may compute the expected delay 24D based on expected delay at each hop and on knowledge of the route or path to the destination node 14, e.g., according to network topology obtained by the radio network node 20. In other embodiments, the radio network node 20 may receive the expected delay 24D, e.g., as control signaling.

No matter which particular delays are accounted for in expected delay 24D, the radio network node 20 in some embodiments uses the remaining delay budget 24R and the expected delay 24D to determine the extent to which compliance with the delay budget 24 might be in jeopardy, e.g., if the margin to the delay budget 24R is expected to be below a threshold. As discussed above, the radio network node 20 may then control the delay with which the radio network node 20 relays or forwards the data block 16, as needed for compliance with the delay budget 24.

In some embodiments, the radio network node 20 determines the remaining delay budget 24R based on an upstream delay 24U. Upstream delay 24U includes delay incurred up until when the upstream node from which the data block 16 was received, e.g., upstream radio network node 20U or source node 12, transmitted the data block 16 to the radio network node 20. In some embodiments, the radio network node 20 receives control signaling from that upstream node indicating this upstream delay 24U.

Alternatively or additionally, the radio network node 20 in some embodiments determines the remaining delay budget 24R based on upstream propagation delay 24P that includes propagation delay between the radio network node and the upstream node from which the data block 16 was received, shown as upstream radio network node 20U in FIG. 2. In some embodiments, the radio network node 20 receives control signaling from that upstream node or a different network node indicating this upstream propagation delay 24P.

Note that the combination of the upstream delay 24U and the upstream propagation delay 24P in some embodiments represents the cumulative delay incurred up until the radio network node 20 receives the data block 16, e.g., at least relative to when the delay budget 24 is measured, which may be from the source node 12 itself or from some other upstream node. In some embodiments, then, the radio network node 20 determines the remaining delay budget 24R as being the delay budget 24 minus the cumulative delay incurred up until the radio network node 20 receives the data block 20.

In some embodiments, though, the radio network node 20 accounts for delay incurred by the radio network node itself, e.g., up until the radio network node 20 is ready to schedule the data block 16. In one or more of these embodiments, for example, the radio network node 20 determines a self time delay (not shown) that is a delay between a receive time when the data block 16 passes a receive reference point in a receive chain of the radio network node 20 and a scheduling time when the data block 16 is available to be scheduled by the radio network node 20 for transmission. The radio network node 20 may then determine the remaining delay budget based on this self time delay.

In one embodiment, for instance, the radio network node 20 calculates a cumulative time delay as the sum of at least two or more of: the upstream delay 24U, the upstream propagation delay 24P, and the self time delay. The radio network node 20 may then calculate the remaining delay budget 24R by subtracting the cumulative time delay from the delay budget 24. The radio network node 20 may for instance receive the delay budget 24 via control signaling.

Figure 3:
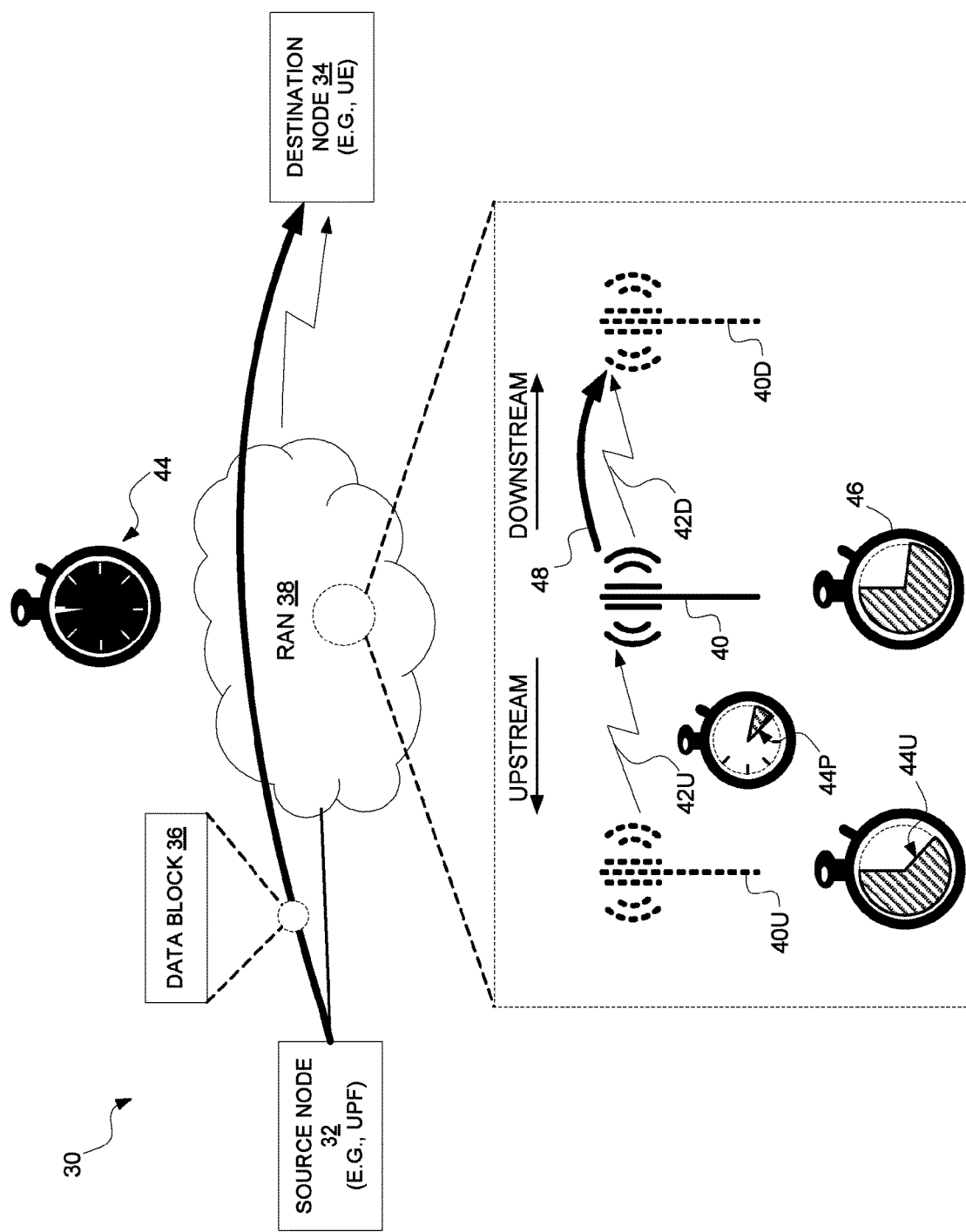
FIG. 3 is a block diagram of a wireless communication system according to other embodiments.

Embodiments herein correspondingly include a radio network node transmitting and/or receiving the control signaling that indicates upstream delay 24U, e.g., to be used for remaining delay budget determination or for other purposes. FIG. 3 illustrates one embodiment in this regard, which may be implemented separately from or in combination with the embodiments shown in FIG. 2.

As shown in FIG. 3, a wireless communication system 20 includes a source node 32 and a destination node 34. The source node 32 transmits a data block 36, e.g., a packet or a transport block, to the destination node 34. In some embodiments, the source node 32 is a network node, e.g., such as a core network node implementing a user plane function (UPF) and the destination node 34 is a wireless communication device, e.g., a user equipment (UE). In these embodiments, then, the data block 36 is a downlink data block transmitted in a downlink direction. In other embodiments, the source node 32 is a wireless communication device and the destination node 34 is a network node, e.g., in the core network of the system 20, such that the data block 36 is an uplink data block transmitted in an uplink direction.

Regardless of whether the data block 36 is transmitted in the uplink or downlink, FIG. 3 shows that the data block 36 is transmitted via a radio access network (RAN) 38. The RAN 38 includes multiple radio network nodes that effectively relay or forward the data block 36 towards the destination node 34, e.g., in a multi-hop fashion. At least some of the radio network nodes exploit a wireless backhaul between the radio network nodes in order to relay or forward the data block 36. FIG. 3 for example shows that a radio network node 40 may receive the data block 36 from an upstream radio network node 40U over an upstream wireless backhaul 42U. "Upstream" here refers to a direction that from the perspective of radio network node 40 is towards the source node 32, e.g., on a path or route that the data block 16 takes. Alternatively or additionally, the radio network node 40 may transmit the data block 36 towards the destination node 34 over a downstream wireless backhaul 42D to a downstream radio network node 40D. "Downstream" here refers to a direction that from the perspective of radio network node 40 is towards the destination node 34, e.g., on a path or route that the data block 36 takes. In embodiment where the system 20 is a 5G system, the radio network node 40 may be an integrated access backhaul (IAB) donor or an IAB node.

Relaying or forwarding the data block 36 towards the destination node 34 in this way incurs delay in delivering the data block 36 to the destination node 34, at least some of which may be exacerbated by or attributable to the wireless nature of the backhaul between radio network nodes. A delay budget 44 in this regard governs how much delay, e.g., between 5 ms and 300 ms, is budgeted for the data block 36 to reach the destination node 34, e.g., in accordance with quality of service (QoS) requirements or expectations at the destination node 34. In some embodiments were the data block 36 is a packet, for instance, the delay budget 44 may take the form of a packet delay budget (PDB), e.g., as defined in 3GPP Technical Specification 23.501 v. 15.1.0. Regardless, each hop or segment on the path that the data block 36 traverses on its way to the destination node 34 consumes at least some of that delay budget 44, e.g., due to propagation delay, radio network node processing delay, delay caused by having to wait for radio resources to become available, etc.

According to some embodiments herein, the radio network node 40 transmits control signaling, e.g., along with or in association with the data block 36, towards the destination node 34 indicating delay incurred for the data block 36. The delay indicated may be for instance the delay incurred up until the time when the radio network node 40 received and/or transmitted the data block 36. Alternatively, the delay indicated may be the delay incurred solely attributable to processing delay by the radio network node 40. Regardless of the particular nature of the delay indicated, this enables the next-hop radio network node to exploit the indicated delay, e.g., for determining remaining delay budget or for some other purpose.

More particularly, the radio network node 40 according to some embodiments, determines a time delay 46. In some embodiments, the time delay 46 is the delay between a reference time and a transmit time, e.g., when the data block 36 passes a transmit reference point in a transmit chain of the radio network node 40. The radio network node 40 transmits towards the destination node 34 control signaling 48 that indicates the determined time delay 46. The control signaling 48 in some embodiments also indicates the delay budget 44.

In some embodiments, the reference time is a time from which the delay budget 44 is measured. This may be for instance when the source node 32 transmits the data block 36. Regardless, in this case, the time delay 46 generally or effectively represents the cumulative delay incurred between when the source node 32 transmits the data block 36 and when the radio network node 40 transmits the data block 36.

In some embodiments, the radio network node 40 determines the time delay 46 based on an upstream delay 44U. Upstream delay 44U includes delay incurred up until when the upstream node from which the data block 36 was received, e.g., upstream radio network node 40U or source node 32, transmitted the data block 16 to the radio network node 40. In some embodiments, the radio network node 40 receives control signaling from that upstream node indicating this upstream delay 44U.

Alternatively or additionally, the radio network node 40 in some embodiments determines the time delay 46 based on upstream propagation delay 44P that includes propagation delay between the radio network node 40 and the upstream node from which the data block 36 was received, shown as upstream radio network node 40U in FIG. 3. In some embodiments, the radio network node 40 receives control signaling from that upstream node or a different network node indicating this upstream propagation delay 44P.

Note that the combination of the upstream delay 44U and the upstream propagation delay 44P in some embodiments represents the cumulative delay incurred up until the radio network node 40 receives the data block 36, e.g., at least relative to when the delay budget 44 is measured, which may be from the source node 12 itself or from some other upstream node. In some embodiments, then, the radio network node 40 determines the time delay 46 as being the addition of the upstream delay 44U and the upstream propagation delay 44P.

In some embodiments, though, the radio network node 40 accounts for delay incurred by the radio network node itself, e.g., up until the radio network node 40 transmits the data block 36. In one or more of these embodiments, for example, the radio network node 40 determines a self time delay (not shown) that is a delay between a receive time when the data block 36 passes a receive reference point in a receive chain of the radio network node 40 and a transmit time when the data block 36 passes a transmit reference point in a transmit chain of the radio network node 40. The radio network node 20 may then determine the time delay 46 based on this self time delay.

In one embodiment, for instance, the radio network node 40 calculates the time delay 46 as the sum of at least two or more of: the upstream delay 44U, the upstream propagation delay 44P, and the self time delay. The radio network node 40 may then indicate this time delay 46 in control signaling 48 transmitted towards the destination node 34, e.g., to the downstream radio network node 40D.

Embodiments herein also include a network node transmitting and/or receiving control signaling that indicates propagation delay, e.g., between a pair of radio network nodes in the system 10.

Figure 4:
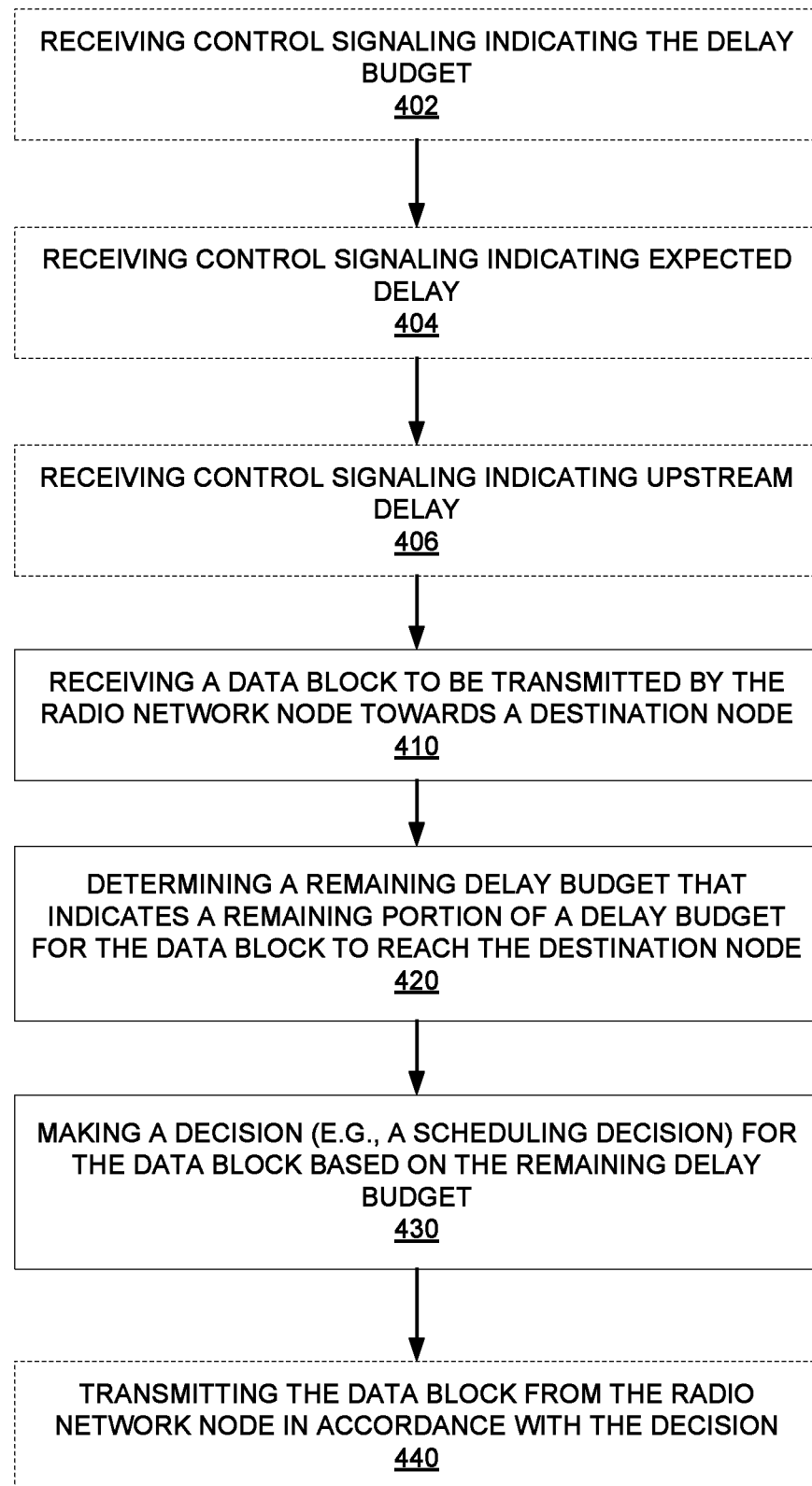
FIG. 4 is a logic flow diagram of a method performed by a radio network node according to some embodiments.

In view of the above modifications and variations, FIG. 4 depicts a method performed by the radio network node 20 in accordance with particular embodiments. The method includes receiving a data block 16 to be transmitted by the radio network node 20 towards a destination node 14 (Block 410). In some embodiments, for example, the data block 16 is received over an upstream wireless backhaul 22U from an upstream radio network node 20U and/or is to be transmitted towards the destination node 14 over a downstream wireless backhaul 22D to a downstream radio network node 20D. Regardless, the method further includes determining a remaining delay budget 24R that indicates a remaining portion of a delay budget 24 for the data block 16 to reach the destination node 14 (Block 420). The method then includes making a decision, e.g., a scheduling decision, for the data block 16 based on the remaining delay budget 24R (Block 430). The decision may for instance dictate how or if the data block 16 is to be transmitted to the destination node 14.

In some embodiments, making the decision for the data block comprises deciding, based on the remaining delay budget, one or more of: whether or not to drop the data block; a modulation and coding scheme with which to schedule the data block for transmission from the radio network node; which one or more transmission resources to allocate for transmission of the data block; which of multiple possible routes to the destination node the data block is to be transmitted over; whether the data block is to be preempted by, or is to preempt, another data block in a transmit buffer of the radio network node; or a priority or timeliness with which the data block is to be transmitted from the radio network node.

In some embodiments, the method also includes transmitting the data block 16 from the radio network node 20 in accordance with the decision (Block 440).

In some embodiments, the decision for the data block is made further based on expected delay that includes delay expected to be incurred after transmitting the data block from the radio network node. In one embodiment, the expected delay includes time duplexing delay expected to be incurred after transmitting the data block from the radio network node, wherein the time duplexing delay includes delay attributable to wireless backhaul transmissions being duplexed in time with access link transmission. Alternatively or additionally, the expected delay may include propagation delay expected to be incurred after transmitting the data block from the radio network node. In one embodiment, the propagation delay expected to be incurred after transmitting the data block from the radio network node includes propagation delay expected to be incurred over each of one or more hops remaining in a transmit path to the destination node. In some embodiments, the method further comprises receiving control signaling that indicates the propagation delay expected.

FIG. 4 accordingly also shows that, in some embodiments, the method includes receiving certain control signalling. In particular, the method in some embodiments includes receiving control signalling indicating the delay budget 24 (Block 402). Alternatively or additionally, the method includes receiving control signalling indicating expected delay 24D that is expected to be incurred, e.g., downstream of the radio network node 20 after transmitting the data block from the radio network node 20 (Block 404).

The method in some embodiments alternatively or additionally includes receiving control signalling indicating upstream delay 24U that includes delay incurred up until when an upstream node transmitted the data block 16 to the radio network node 20 (Block 406).

In some embodiments, the data block is received from an upstream node. In this case, the method may further comprise receiving from the upstream node control signaling indicating an upstream delay that includes delay incurred up until when the upstream node transmitted the data block to the radio network node. The remaining delay budget may then be determined based on the indicated upstream delay.

Alternatively or additionally, the method may further comprise determining a self time delay that is a delay between a receive time when the data block passes a receive reference point in a receive chain of the radio network node and a scheduling time when the data block is available to be scheduled by the radio network node for transmission. The remaining delay budget may be determined based on the self time delay.

Alternatively or additionally, the method may further comprise determining upstream propagation delay that includes propagation delay between the upstream node from which the data block was received and the radio network node. The remaining delay budget may be determined based on the upstream propagation delay.

In some embodiments, for example, the method comprises (i) receiving from the upstream node control signaling indicating an upstream delay that includes delay incurred up until when the upstream node transmitted the data block to the radio network node; (ii) determining upstream propagation delay that includes propagation delay between the upstream node and the radio network node; (iii) determining a self time delay that is a delay between a receive time when the data block passes a receive reference point in a receive chain of the radio network node and a scheduling time when the data block is available to be scheduled by the radio network node for transmission; (iv) calculating a cumulative time delay as a sum of a least the upstream delay, the upstream propagation delay, and the self time delay; and (v) calculating the remaining delay budget by subtracting the cumulative time delay from the delay budget. In any of these embodiments, the method may comprise receiving control signaling indicating the upstream propagation delay.

In some embodiments, the data block is a packet, and the delay budget is a packet delay budget, PDB. Alternatively, in other embodiments, the data block is a transport block that carries data from one or more packets.

In any of these embodiments, the method may further comprise receiving control signaling indicating the delay budget.

In any of these embodiments, the radio network node may be an integrated access backhaul, IAB, node in a New Radio wireless communication system.

Figure 5:
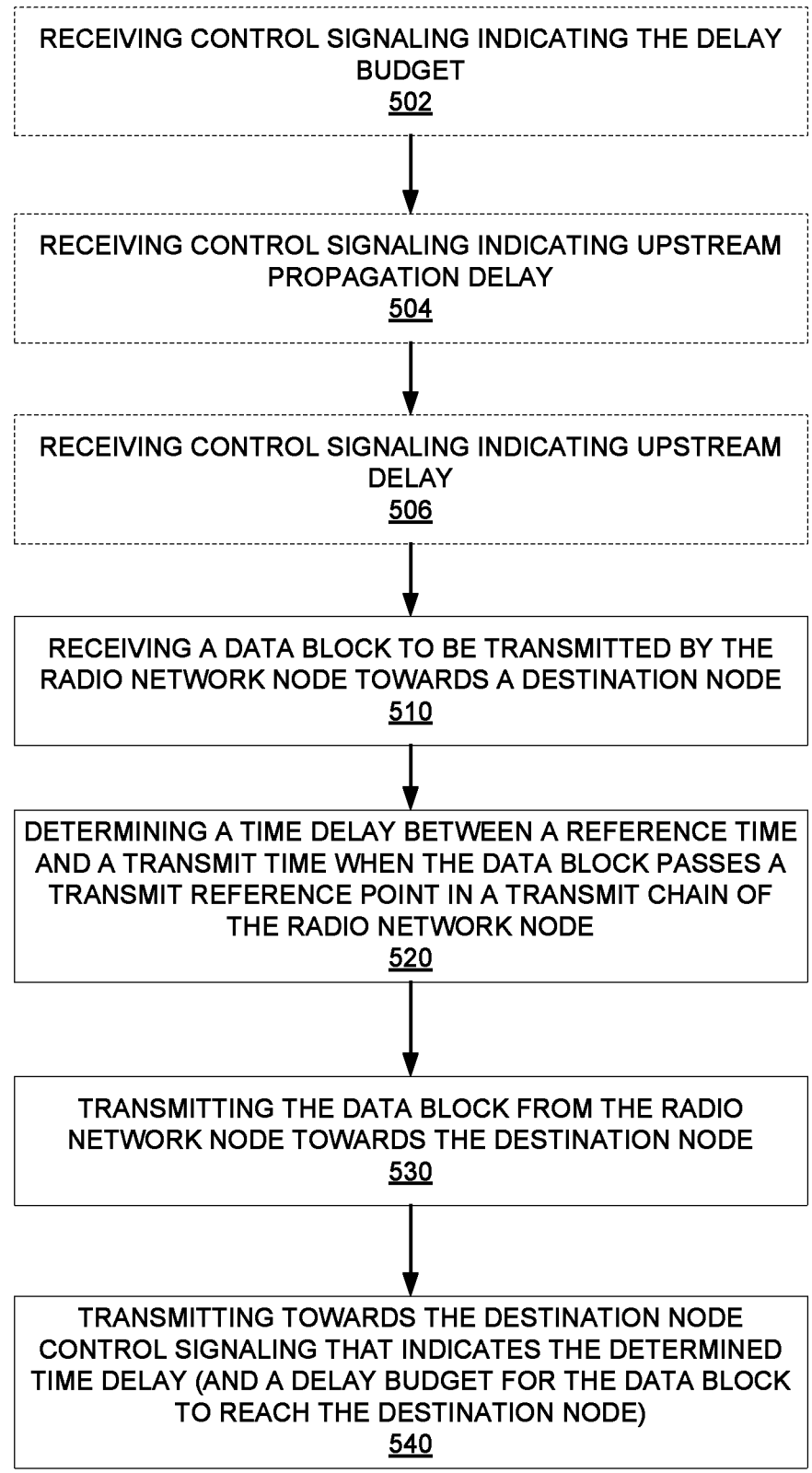
FIG. 5 is a logic flow diagram of a method performed by a radio network node according to other embodiments.

FIG. 5 depicts a method performed by a radio network node 40 in accordance with other particular embodiments. The method includes receiving a data block 36 to be transmitted by the radio network node 40 towards a destination node 34 (Block 510). In some embodiments, for example, the data block 36 is received over an upstream wireless backhaul 42U from an upstream radio network node 40U and/or is to be transmitted towards the destination node 34 over a downstream wireless backhaul 42D to a downstream radio network node 40D. Regardless, the method further includes determining a time delay 46 between a reference time and a transmit time when the data block 36 passes a transmit reference point in a transmit chain of the radio network node 40 (Block 520). The method further includes transmitting the data block 36 from the radio network node 40 towards the destination node 34 (Block 530). The method also includes transmitting towards the destination node 34 control signaling 48 that indicates the determined time delay 46 (Block 540). The control signaling 48 in some embodiments may also include a delay budget 44 for the data block 36 to reach the destination node 34.

FIG. 5 also shows that, in some embodiments, the method includes receiving certain control signalling. In particular, the method in some embodiments includes receiving control signalling indicating the delay budget 44 (Block 502). Alternatively or additionally, the method includes receiving control signaling indicating upstream propagation delay that includes propagation delay between an upstream node and the radio network node 40 (Block 504). The method in some embodiments alternatively or additionally includes receiving control signalling indicating upstream delay 44U that includes delay incurred up until when an upstream node 40U transmitted the data block 36 to the radio network node 40 (Block 506).

In some embodiments, the reference time is a time from which the delay budget is measured. In other embodiments, the reference time is a receive time when the data block passes a receive reference point in a receive chain of the radio network node.

In some embodiments, the data block is received from an upstream node. In this case, the method may further comprise receiving from the upstream node control signaling indicating an upstream delay that includes delay incurred between the reference time and a time when the upstream node transmitted the data block to the radio network node. The time delay may be determined based on the indicated upstream delay.

In some embodiments, the method further includes determining a self time delay that is a delay between a receive time when the data block passes a receive reference point in a receive chain of the radio network node and the transmit time. The time delay may be determined based on the self time delay.

In some embodiments, the data block is received from an upstream node. In this case, the method may further comprise determining upstream propagation delay that includes propagation delay between the upstream node and the radio network node. The time delay may be determined based on the upstream propagation delay.

In other embodiments, the data block is received from an upstream node. In this case, the method may further comprise (i) receiving from the upstream node control signaling indicating an upstream delay that includes delay incurred between the reference time and a time when the upstream node transmitted the data block to the radio network node; (ii) determining upstream propagation delay that includes propagation delay between the upstream node and the radio network node; (iii) determining a self time delay that is a delay between a receive time when the data block passes a receive reference point in a receive chain of the radio network node and the transmit time, and (iv) calculating the time delay as a sum of at least the indicated upstream delay, the upstream propagation delay, and the self time delay. In some embodiments, the method comprises receiving control signaling indicating the upstream propagation delay.

In some embodiments, the data block is a packet, and the delay budget is a packet delay budget, PDB. Alternatively, in other embodiments, the data block is a transport block that carries data from one or more packets.

In any of these embodiments, the method may further comprise receiving control signaling indicating the delay budget.

In any of these embodiments, the radio network node may be an integrated access backhaul, IAB, node in a New Radio wireless communication system.

Figure 6:
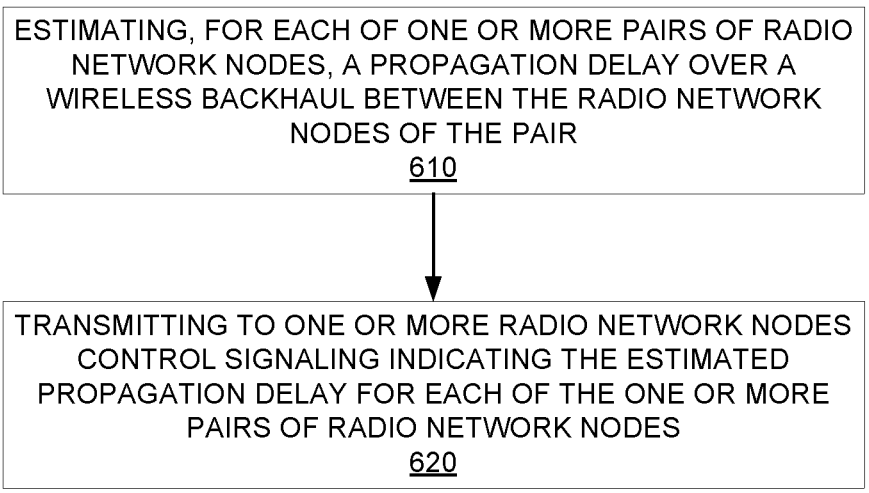
FIG. 6 is a logic flow diagram of a method performed by a network node according to some embodiments.

FIG. 6 depicts a method performed by a network node in accordance with other particular embodiments. The method includes estimating, for each of one or more pairs of radio network nodes, a propagation delay over a wireless backhaul between the radio network nodes of the pair (Block 610). The method also includes transmitting to one or more radio network nodes control signaling indicating the estimated propagation delay for each of the one or more pairs of radio network nodes (Block 620).

In some embodiments, the one or more pairs of radio network nodes comprise one or more pairs of integrated access backhaul, IAB, nodes in a New Radio wireless communication system.

In some embodiments, the network node is an integrated access backhaul, IAB, donor node in a New Radio wireless communication system.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
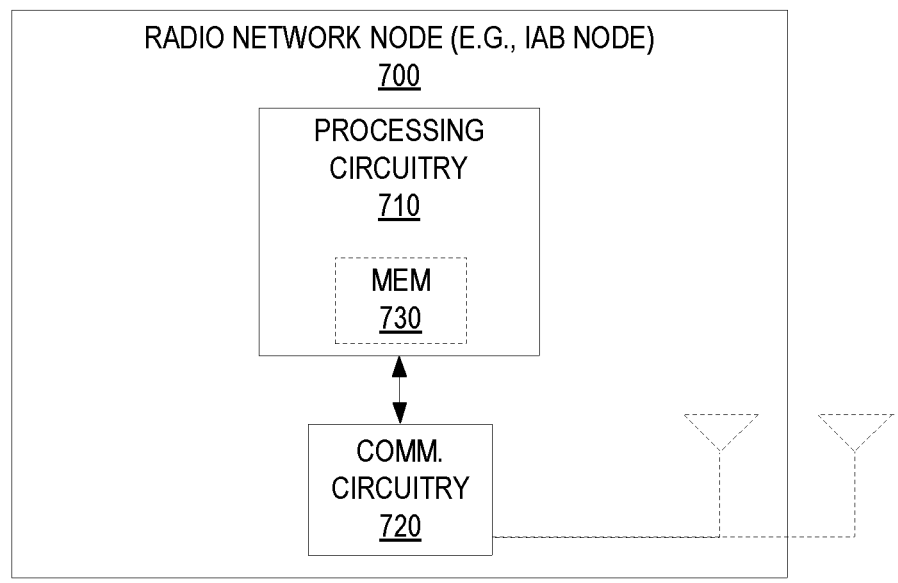
FIG. 7 is a block diagram of a radio network node according to some embodiments.

FIG. 7 for example illustrates a radio network node 700 as implemented in accordance with one or more embodiments. As shown, the radio network node 700 includes processing circuitry 710 and communication circuitry 720. The communication circuitry 720, e.g., radio circuitry, is configured to transmit and/or receive information to and/or from one or more other nodes, e.g., via any communication technology. Such communication may occur via one or more antennas that are either internal or external to the radio network node 700. The processing circuitry 710 is configured to perform processing described above, e.g., in FIGS. 4 and/or 5, such as by executing instructions stored in memory 730. The processing circuitry 710 in this regard may implement certain functional means, units, or modules.

Figure 8A:
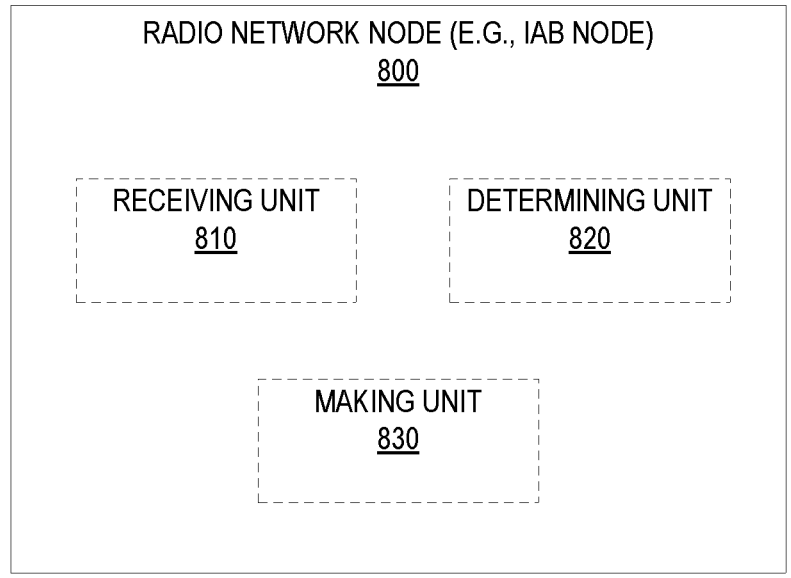
FIG. 8A is a block diagram of a radio network node according to other embodiments.
Figure 12:
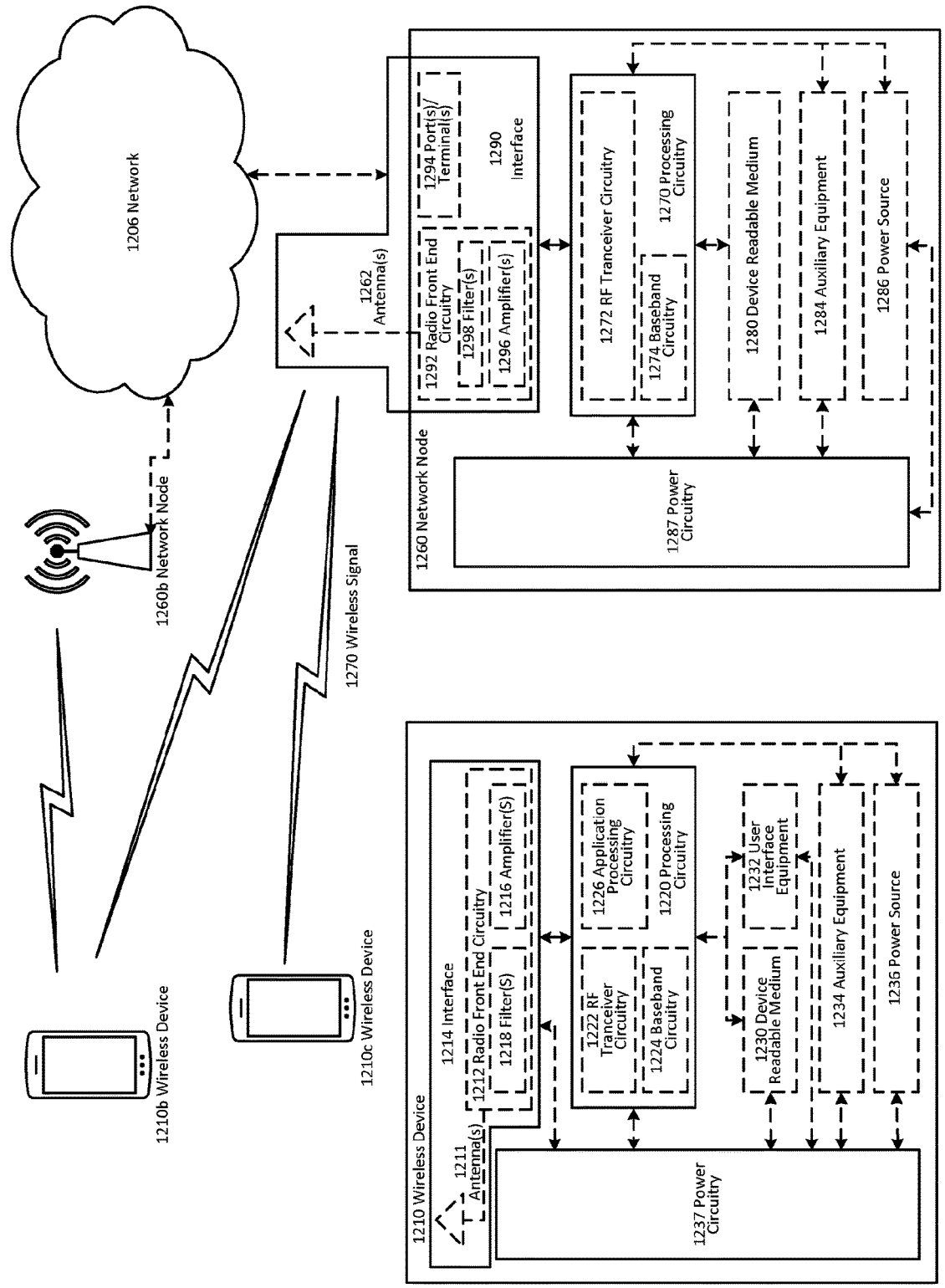
FIG. 12 is a block diagram of a wireless communication network according to some embodiments.

FIG. 8A illustrates a schematic block diagram of a radio network node 800 in a wireless network according to still other embodiments; for example, the wireless network shown in FIG. 12. As shown, the radio network node 800 implements various functional means, units, or modules, e.g., via the processing circuitry 710 in FIG. 7 and/or via software code. These functional means, units, or modules, e.g., for implementing the method in FIG. 4, include for instance a receiving unit 810 for receiving a data block 36 to be transmitted by the radio network node 40 towards a destination node 34. Also included may be a determining unit 820 for determining a remaining delay budget 24R that indicates a remaining portion of a delay budget 24 for the data block 16 to reach the destination node 14. Further included may be a decision making unit 830 for making a decision, e.g., a scheduling decision, for the data block 16 based on the remaining delay budget 24R.

Figure 8B:
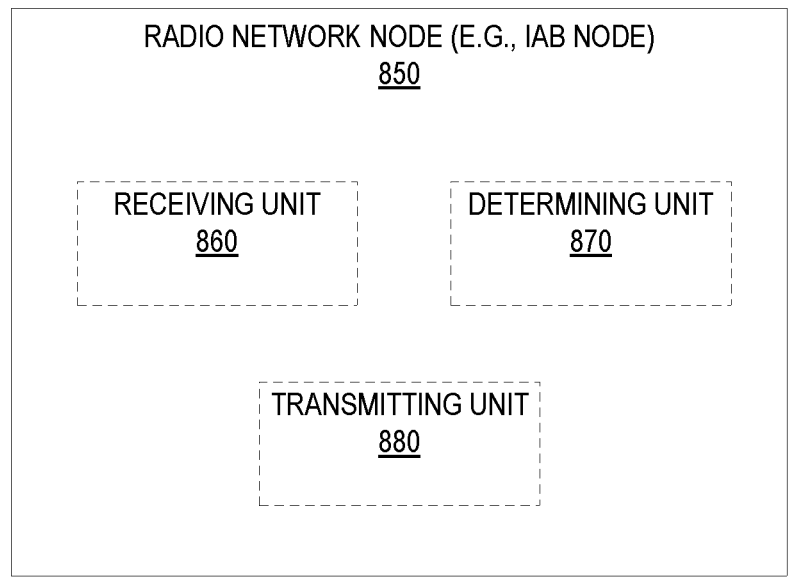
FIG. 8B is a block diagram of a radio network node according to still other embodiments.

FIG. 8B illustrates a schematic block diagram of a radio network node 850 in a wireless network according to still other embodiments; for example, the wireless network shown in FIG. 12. As shown, the radio network node 850 implements various functional means, units, or modules, e.g., via the processing circuitry 710 in FIG. 7 and/or via software code. These functional means, units, or modules, e.g., for implementing the method in FIG. 5, include for instance a receiving unit 860 for receiving a data block 36 to be transmitted by the radio network node 40 towards a destination node 34. Also included may be a determining unit 870 for determining a time delay 46 between a reference time and a transmit time when the data block 36 passes a transmit reference point in a transmit chain of the radio network node 40. Further included may be a transmitting unit 880 for transmitting the data block 36 from the radio network node 40 towards the destination node 34 and for transmitting towards the destination node 34 control signaling 48 that indicates the determined time delay 46. The control signaling 48 in some embodiments may also include a delay budget 44 for the data block 36 to reach the destination node 34.

Figure 9:
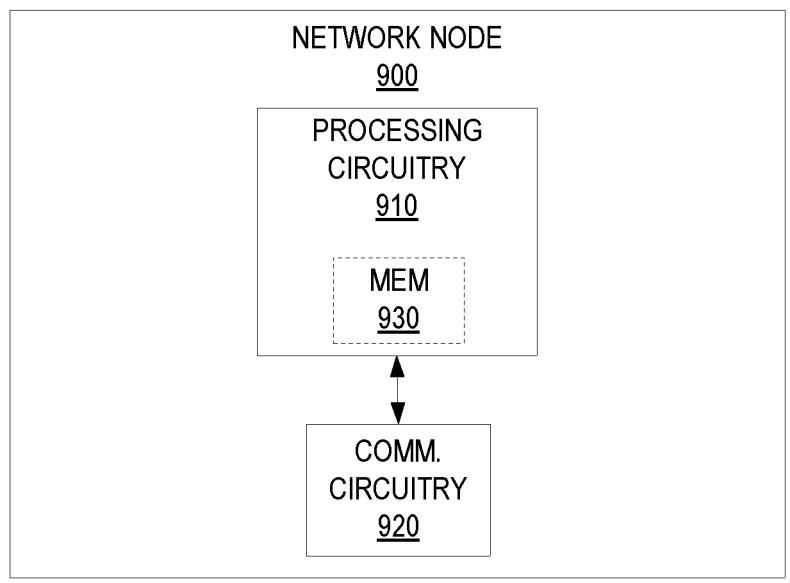
FIG. 9 is a block diagram of a network node according to some embodiments.

FIG. 9 illustrates a network node 900 as implemented in accordance with one or more embodiments. As shown, the network node 900 includes processing circuitry 910 and communication circuitry 920. The communication circuitry 920 is configured to transmit and/or receive information to and/or from one or more other nodes, e.g., via any communication technology. The processing circuitry 910 is configured to perform processing described above, e.g., in FIG. 6, such as by executing instructions stored in memory 930. The processing circuitry 910 in this regard may implement certain functional means, units, or modules.

Figure 10:
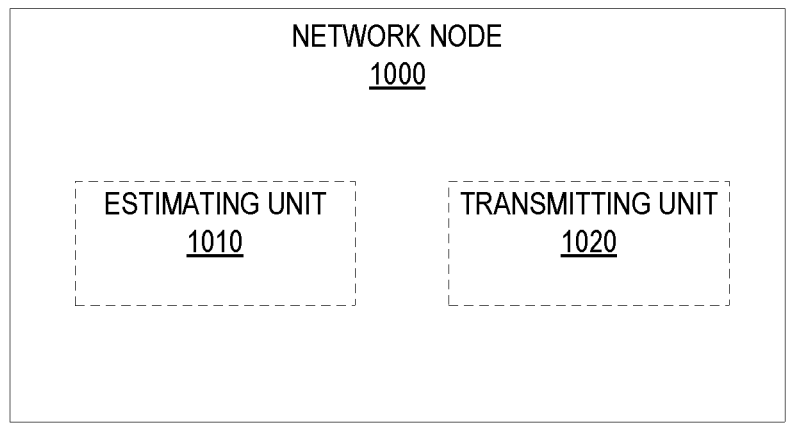
FIG. 10 is a block diagram of a network node according to other embodiments.

FIG. 10 illustrates a schematic block diagram of a network node 1000 in a wireless network according to still other embodiments; for example, the wireless network shown in FIG. 12. As shown, the network node 1000 implements various functional means, units, or modules, e.g., via the processing circuitry 910 in FIG. 9 and/or via software code. These functional means, units, or modules, e.g., for implementing the method(s) herein, include for instance an estimating unit 1010 for estimating, for each of one or more pairs of radio network nodes, a propagation delay over a wireless backhaul between the radio network nodes of the pair. Also included is a transmitting unit 1020 for transmitting to one or more radio network nodes control signaling indicating the estimated propagation delay for each of the one or more pairs of radio network nodes.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable storage or recording medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Some embodiments address certain challenge(s). As an IAB system is a multi-hop system, a packet traversing the IAB system will be delayed in proportion to the number of hops, including waiting time in buffering queues. For some services, the delay needs to be controlled and ensured to not exceed the specified limits. In existing solutions there are no means for the individual RAN nodes (IAB nodes) to know how much of the delay budget has already been consumed when the scheduler in the IAB node(s) allocate resources for the next hop.

Certain aspects of the present disclosure and their embodiments may provide solutions to these or other challenges. Some embodiments use the QoS parameter packet delay budget (PDB) and then estimate/measure the propagation delay and processing time when a data packet passes the different IAB nodes. This information may then be used by the scheduler in each IAB node to optimize resource allocation to meet the PDB requirement.

Certain embodiments may provide one or more of the following technical advantage(s): (1) Provide a mechanism for the schedulers in a multi-hop system to deliver data within a given delay budget; (2) Provide methods to measure how much time is consumed for a data packet in terms of either the overall delay or the processing time in each relay node; and/or (3) Utilize 1588 not only to ensure phase/time synchronization but also for delay.

More particularly, the Packet delay budget (PDB) is a quality of service characteristics parameter represented by a 5QI value, [ref: 3GPP TS 23.501]. In particular, a 5QI value is a 5G QoS Identifier, which is a scalar that is used as a reference to a specific QoS forwarding behavior, e.g. packet loss rate, packet delay budget, to be provided to a 5G QoS Flow. The Packet Delay Budget (PDB) defines an upper bound for the time that a packet may be delayed between the UE and the UPF that terminates the N6 interface. The 5QI value can be added to the header of the data packet in the UPF or can be read from the control data sent from the AMF to the NGRAN. By measuring or making estimations of the consumed processing time at each IAB node plus the propagation time between each relay node, some embodiments calculate how much time of the PDB has been consumed. In some embodiments, this information is used by the scheduler for the next hop when allocating the needed resources. A precision time protocol (PTP) such as 1588 is used in some embodiments to enable time synchronization of the IAB nodes and to generate data ingress and egress timestamps to be used to calculate the actual packet delay.

Figure 1:
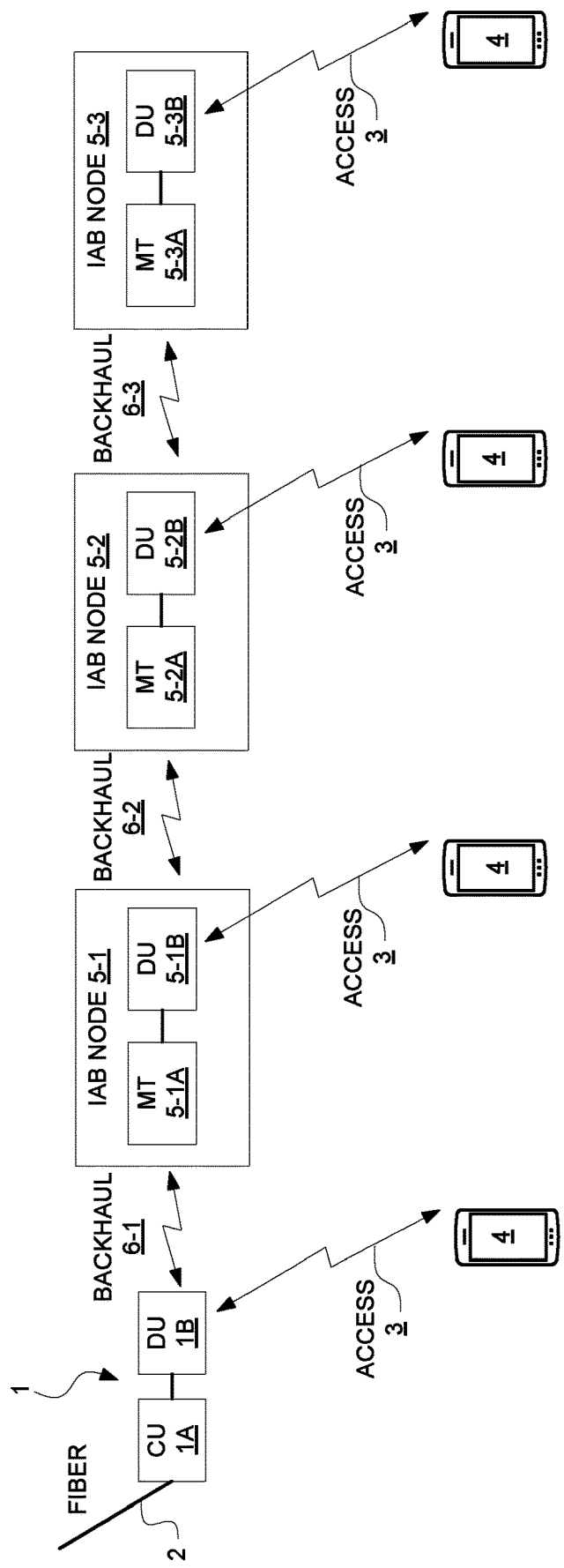
FIG. 1 is a block diagram of an Integrated Access Backhaul (IAB) system according to some embodiments.
Figure 11A:
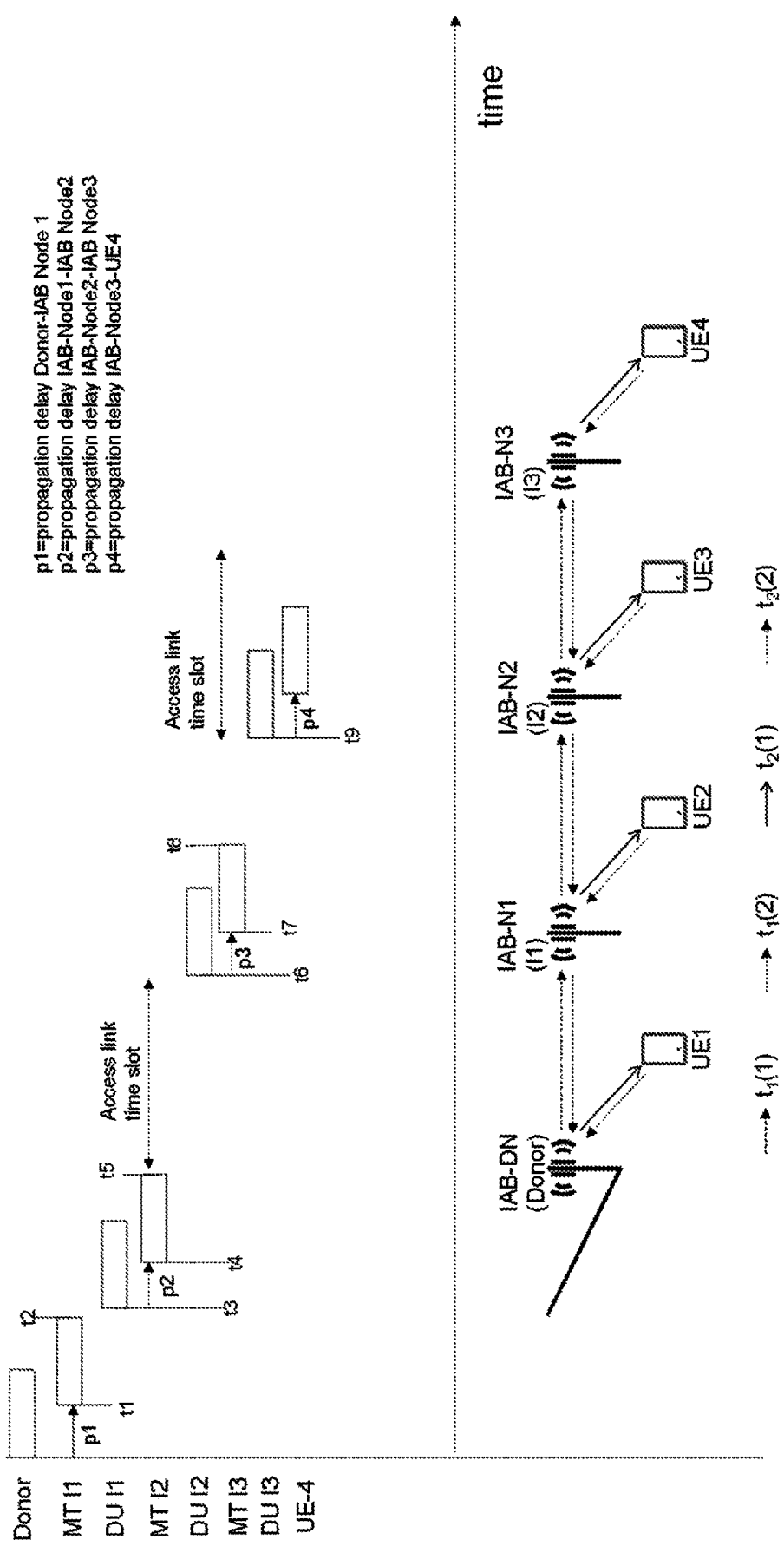
FIG. 11A is a timing diagram for calculating a remaining delay budget according to some embodiments.

For example, FIG. 11A describes in a time diagram the different delay contributions from propagation delay and processing delay when a transport block of a data packet is transmitted from an IAB donor down to a UE over an IAB system as the one in FIG. 1. It should also be noted that an IAB system in some embodiments will have a half duplexing constraint, meaning that the transmitter of the IAB node in normal data sending mode will not transmit when the receiver receives data to avoid self interference. One possible scheme for this is also illustrated in FIG. 11A.

As shown, the timestamps t1, t2, . . . , t9 together with the propagation delays (p1, p2, p3) are used to calculate the time elapsed since the data packet was sent from the donor. The consumed time when the packet arrives to the IAB Node 1 DU scheduler is $t_{DU1\_Sched} = p1+(t2-t1)+t0$, where t0 denotes the already processed time from when the data chunk arrived at the UPF function. When it is transmitted from the IAB-N1 DU, it becomes $t_{DU1\_Tx} = t_{DU1\_Sched}+(t3-t2)$. IAB-N2 DU Scheduler can be expressed as $t_{DU2\_Sched} = p2+t_{DU1\_Tx}$ (t5-t4). The elapsed time when data is transmitted from the IAB-N2 DU is $t_{DU2\_Tx} = t_{DU2\_Sched}+(t6-t5)$. It should be noted that t6-t5 also includes the time slot for the Access links as described in lower part of FIG. 11. IAB-N3 DU Scheduler can be expressed as $t_{DU3\_Sched} = p3+t_{DU2\_Tx}$ (t8-t7). However, the last transmission from the IAB-N3 DU to the UE must take place in the Access link timeslot so the elapsed time at the last transmission is $t_{DU3\_Tx} = t_{DU3\_Sched}+$ (t9-t8). To be able to make the calculations for the elapsed time in each IAB node, in some embodiments the propagation delay between each of the nodes is known and a mechanism for taking the timestamps including a protocol for sending the timestamps is in place. Such a protocol in some embodiments is an IAB control channel which has fields allocated for time stamp.

Some embodiments include different alternatives to estimate the propagation delay. In one embodiment, a "radar" like approach is used by measuring the roundtrip time for the reflected echo of some robust signal like the signals in the Synchronization Signal Block (SSB). Another embodiment uses the delay estimation that is used when calculating the timing advance (TA) based on the Random Access Channel (RACH) signal.

Figure 11B:
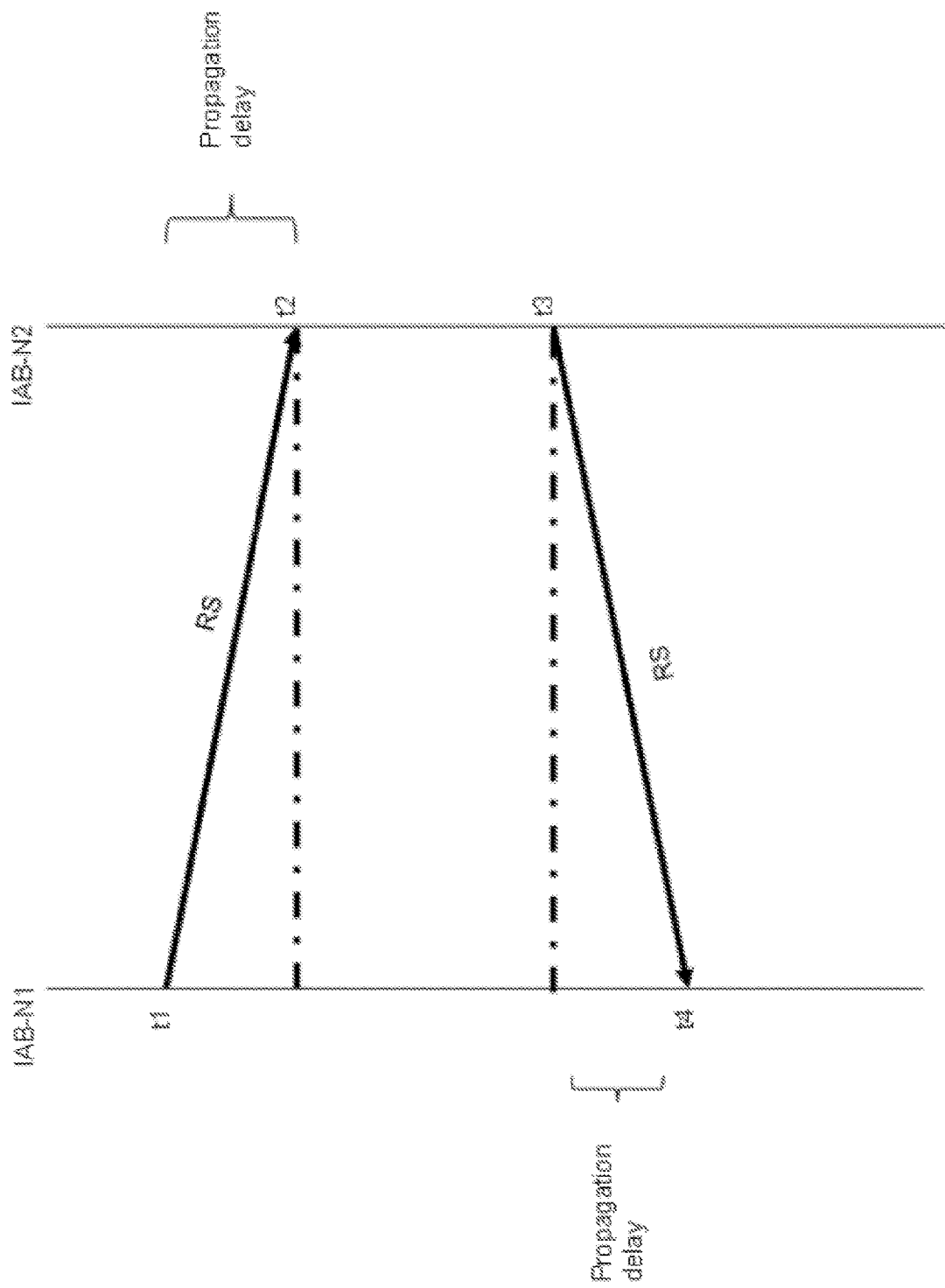
FIG. 11B is a timing diagram for signalling between IAB nodes according to some embodiments.

Yet another embodiment uses the method from 1588 of sending a signal from the DU to the MT and recording the time when it was transmitted and when it is received. Some embodiments thereby transmit another signal from the MT to the DU and recording the time when it is transmitted and received. FIG. 11B describes the principle and how the propagation delay can be calculated with this method. The assumption here is that the propagation delay is symmetric and the delay can be $$\text{delay} = \frac{(t4 - t1) + (t2 - t3)}{2}.$$

calculated as

The calculated propagation delay is assumed to be static unless the path is changed so these values could be stored.

In some embodiments, the steps involved in ensuring that packet delay budget (PDB) is kept in the example of FIG. 11A may be described as:
1. The propagation delays between the nodes is known and have been distributed to the different IAB nodes
2. The PDB is given as a 5QI parameter, e.g., 100 ms for conversational voice is represented with the integer "1", which is either added to the Service Data Adaptation Protocol (SDAP) header or communicated from the Access and Mobility Function (AMF) to the donor CU as an NG Application Protocol (NGAP) message.
3. The initial delay t0 representing the average time for data to pass from UPF to CU-DU in the donor is loaded into the IAB control channel. The control channel is sent together with the first transport block of the data packet to IAB-N1.
4. IAB-N1 takes the timestamp t1 when the first sample of the first Orthogonal Frequency Division Multiplexing (OFDM) symbol of the received data is entering the analog-to-digital converter in the MT
5. IAB-N1 takes the timestamp t2 after MT has decoded the first transport block.
6. IAB-N1 calculates $t_{DU1\_Sched}=p1+(t2-t1)+t0$,
7. IAB-N1 calculates PDB-$t_{DU1\_Sched}$ to know how much is left of the PDB. The result is used by the IAB-N1 scheduler.
8. The DU of IAB-N1 takes a timestamp t3 when the last sample of the last OFDM symbol of the transmitted transport block is leaving the digital-to-analog converter or the Inverse Fast Fourier Transform (IFFT)
9. IAB-N1 calculates $t_{DU1\_Tx}=t_{DU1\_Sched}+(t3-t2)$ and adds this value to the IAB control channel which is sent to the IAB-N2.
10. IAB-N2 takes the timestamp t4 when the first sample of the first OFDM symbol of the received data is entering the analog-to-digital converter in the MT
11. IAB-N2 takes the timestamp t5 after MT has decoded the first transport block.
12. IAB-N2 calculates $t_{DU2\_Sched}=p2+t_{DU1\_Tx}$ (t5-t4).
13. IAB-N2 calculates PDB-$t_{DU2\_Sched}$ to know how much is left of the PDB. The result is used by the IAB-N2 scheduler.
14. The DU of IAB-N1 takes a timestamp t3 when the last sample of the last OFDM symbol of the transmitted transport block is leaving the digital-to-analog converter or the IFFT
15. IAB-N1 calculates $t_{DU2\_Tx}=t_{DU1\_Sched}+(t6-t5)$ and adds this value to the IAB control channel which is sent to the IAB-N2.
16. IAB-N3 takes the timestamp t7 when the first sample of the first OFDM symbol of the received data is entering the analog-to-digital converter in the MT
17. IAB-N3 takes the timestamp t8 after MT has decoded the first transport block.
18. IAB-N3 calculates $t_{DU3\_Sched}=p3+t_{DU2\_Tx}+(t8-t7)$.
19. IAB-N3 calculates PDB-$t_{DU3\_Sched}$ to know how much is left of the PDB.

The result is used by the IAB-N3 scheduler.

As a multihop system will have to have a mechanism for routing a data packet either to the next hop through a backhaul to the next node or to an access UE, the time stamp information in some embodiments is carried over the backhaul links. But in some embodiments the time stamp information is discarded from the data sent on the access link. Accordingly, some embodiments define an IAB control channel for the time stamp information. Other embodiments enhance the F1 Application Protocol (F1AP) with IAB related control messages enabling the donor-CU to control the IAB nodes like configuring time slot allocation for the selected duplexing scheme.

Although these embodiments were exemplified in the downlink, other embodiments are extended for the upstream direction. In this case, the IAB-N3 will be the first node to take the initial time stamps.

With CU being cloudified, some embodiments in advance, given the delay estimations, simulate and find possible optimal configurations resulting in keeping packet delay within a programmed limit. These simulations/calculations may be done in the background represented by different delay profiles which could be programmable by the operator or some artificial intelligence (AI) function from the core network.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260b, and WDs 1210, 1210b, and 1210c. In practice, a wireless network may further include any additional elements suitable to support communication between wireless devices or between a wireless device and another communication device, such as a landline telephone, a service provider, or any other network node or end device. Of the illustrated components, network node 1260 and wireless device (VVD) 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WMax), Bluetooth, Z-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (VVLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, VViFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WDs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1290 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless device (VVD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (loT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 may include multiple sets of one or more of the illustrated components for different wireless technologies supported by WD 1210, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1210.

Antenna 1211 may include one or more antennas or antenna arrays, configured to send and/or receive wireless signals, and is connected to interface 1214. In certain alternative embodiments, antenna 1211 may be separate from WD 1210 and be connectable to WD 1210 through an interface or port. Antenna 1211, interface 1214, and/or processing circuitry 1220 may be configured to perform any receiving or transmitting operations described herein as being performed by a WD. Any information, data and/or signals may be received from a network node and/or another WD. In some embodiments, radio front end circuitry and/or antenna 1211 may be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220, and is configured to condition signals communicated between antenna 1211 and processing circuitry 1220. Radio front end circuitry 1212 may be coupled to ora part of antenna 1211. In some embodiments, WD 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or WDs via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of WD 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a WD may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 may be configured to perform any determining, calculating, or similar operations (e.g., certain obtaining operations) described herein as being performed by a WD. These operations, as performed by processing circuitry 1220, may include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with WD 1210. Such interaction may be of many forms, such as visual, audial, tactile, etc. User interface equipment 1232 may be operable to produce output to the user and to allow the user to provide input to WD 1210. The type of interaction may vary depending on the type of user interface equipment 1232 installed in WD 1210. For example, if WD 1210 is a smart phone, the interaction may be via a touch screen; if WD 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices and circuits. User interface equipment 1232 is configured to allow input of information into WD 1210, and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from WD 1210, and to allow processing circuitry 1220 to output information from WD 1210. User interface equipment 1232 may include, for example, a speaker, a display, vibrating circuitry, a USB port, a headphone interface, or other output circuitry. Using one or more input and output interfaces, devices, and circuits, of user interface equipment 1232, WD 1210 may communicate with end users and/or the wireless network, and allow them to benefit from the functionality described herein.

Auxiliary equipment 1234 is operable to provide more specific functionality which may not be generally performed by WDs. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. WD 1210 may further comprise power circuitry 1237 for delivering power from power source 1236 to the various parts of WD 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case WD 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236. Power circuitry 1237 may perform any formatting, converting, or other modification to the power from power source 1236 to make the power suitable for the respective components of WD 1210 to which power is supplied.

Figure 13:
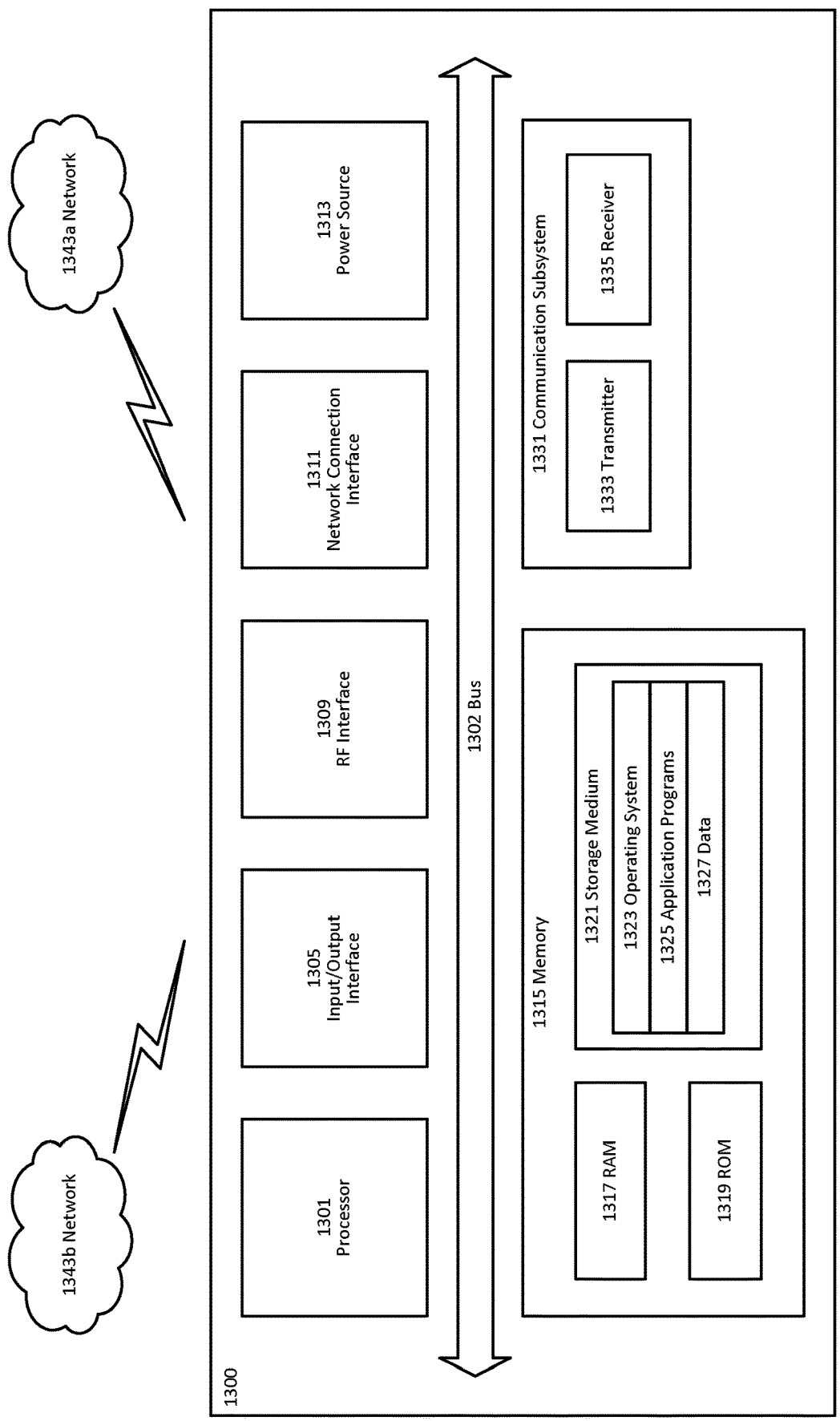
FIG. 13 is a block diagram of a user equipment according to some embodiments.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 13200 may be any UE identified by the $3^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1301 may be configured to process computer instructions and data. Processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 may include two central processing units (CPUs). Data may be information in a form suitable for use by a computer.

In the depicted embodiment, input/output interface 1305 may be configured to provide a communication interface to an input device, output device, or input and output device. UE 1300 may be configured to use an output device via input/output interface 1305. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1305 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1309 may be configured to provide a communication interface to RF components such as a transmitter, a receiver, and an antenna. Network connection interface 1311 may be configured to provide a communication interface to network 1343*a*. Network 1343*a* may encompass wired and/or wireless networks such as a local-area network (LAN), a wide-area network (WAN), a computer network, a wireless network, a telecommunications network, another like network or any combination thereof. For example, network 1343*a* may comprise a Wi-Fi network. Network connection interface 1311 may be configured to include a receiver and a transmitter interface used to communicate with one or more other devices over a communication network according to one or more communication protocols, such as Ethernet, TCP/IP, SONET, ATM, or the like. Network connection interface 1311 may implement receiver and transmitter functionality appropriate to the communication network links (e.g., optical, electrical, and the like). The transmitter and receiver functions may share circuit components, software or firmware, or alternatively may be implemented separately.

RAM 1317 may be configured to interface via bus 1302 to processing circuitry 1301 to provide storage or caching of data or computer instructions during the execution of software programs such as the operating system, application programs, and device drivers. ROM 1319 may be configured to provide computer instructions or data to processing circuitry 1301. For example, ROM 1319 may be configured to store invariant low-level system code or data for basic system functions such as basic input and output (I/O), startup, or reception of keystrokes from a keyboard that are stored in a non-volatile memory. Storage medium 1321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 may be configured to include operating system 1323, application program 1325 such as a web browser application, a widget or gadget engine or another application, and data file 1327. Storage medium 1321 may store, for use by UE 1300, any of a variety of various operating systems or combinations of operating systems.

Storage medium 1321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a device readable medium.

In FIG. 13, processing circuitry 1301 may be configured to communicate with network 1343*b* using communication subsystem 1331. Network 1343*a* and network 1343*b* may be the same network or networks or different network or networks. Communication subsystem 1331 may be configured to include one or more transceivers used to communicate with network 1343*b*. For example, communication subsystem 1331 may be configured to include one or more transceivers used to communicate with one or more remote transceivers of another device capable of wireless communication such as another WD, UE, or base station of a radio access network (RAN) according to one or more communication protocols, such as IEEE 802.13, CDMA, WCDMA, GSM, LTE, UTRAN, WiMax, or the like. Each transceiver may include transmitter 1333 and/or receiver 1335 to implement transmitter or receiver functionality, respectively, appropriate to the RAN links (e.g., frequency allocations and the like). Further, transmitter 1333 and receiver 1335 of each transceiver may share circuit components, software or firmware, or alternatively may be implemented separately.

In the illustrated embodiment, the communication functions of communication subsystem 1331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 may include cellular communication, Wi-Fi communication, Bluetooth communication, and GPS communication. Network 1343b may encompass wired and/or wireless networks such as a local-area network (LAN), a wide-area network (WAN), a computer network, a wireless network, a telecommunications network, another like network or any combination thereof. For example, network 1343b may be a cellular network, a Wi-Fi network, and/or a near-field network. Power source 1313 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software or firmware. In one example, communication subsystem 1331 may be configured to include any of the components described herein. Further, processing circuitry 1301 may be configured to communicate with any of such components over bus 1302. In another example, any of such components may be represented by program instructions stored in memory that when executed by processing circuitry 1301 perform the corresponding functions described herein. In another example, the functionality of any of such components may be partitioned between processing circuitry 1301 and communication subsystem 1331. In another example, the non-computationally intensive functions of any of such components may be implemented in software or firmware and the computationally intensive functions may be implemented in hardware.

Figure 14:
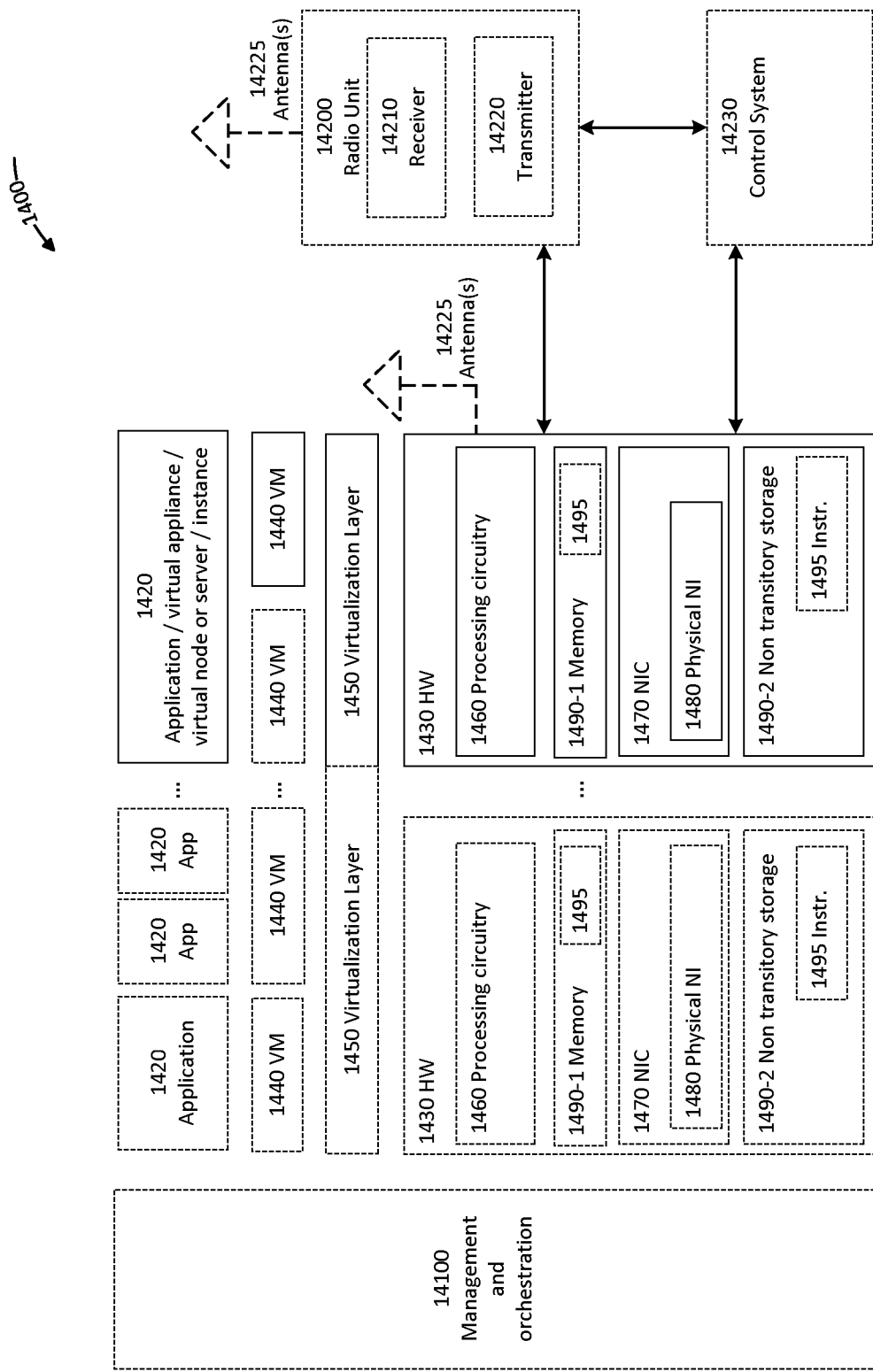
FIG. 14 is a block diagram of a virtualization environment according to some embodiments.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 14, hardware 1430 may be a standalone network node with generic or specific components. Hardware 1430 may comprise antenna 14225 and may implement some functions via virtualization. Alternatively, hardware 1430 may be part of a larger cluster of hardware (e.g. such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signalling can be effected with the use of control system 14230 which may alternatively be used for communication between the hardware nodes 1430 and radio units 14200.

Figure 15:
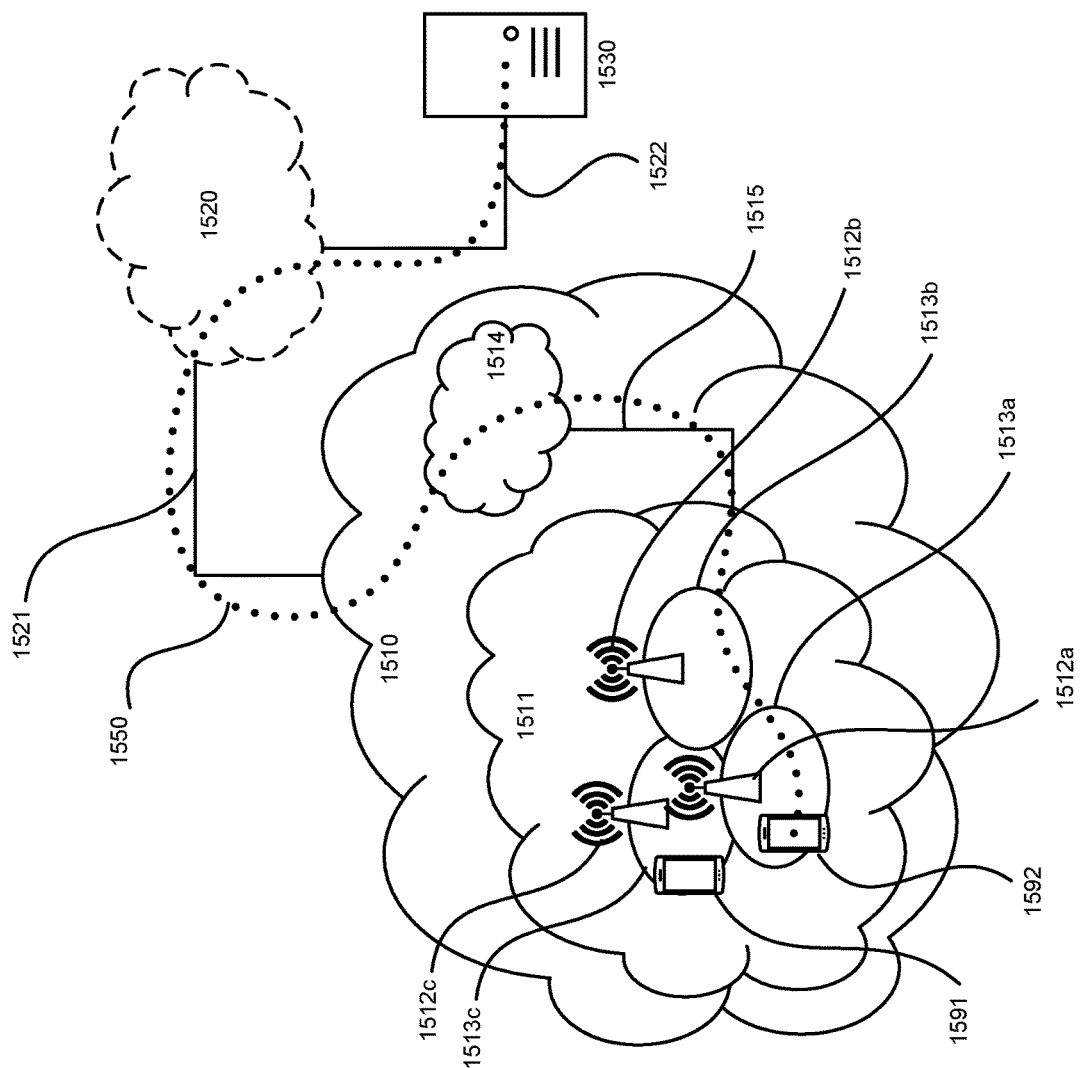
FIG. 15 is a block diagram of a communication network with a host computer according to some embodiments.

FIG. 15 illustrates a telecommunication network connected via an intermediate network to a host computer in accordance with some embodiments. In particular, with reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512a, 1512b, 1512c, such as NBs, eNBs, gNBs or other types of wireless access points, each defining a corresponding coverage area 1513a, 1513b, 1513c. Each base station 1512a, 1512b, 1512c is connectable to core network 1514 over a wired or wireless connection 1515. A first UE 1591 located in coverage area 1513c is configured to wirelessly connect to, or be paged by, the corresponding base station 1512c. A second UE 1592 in coverage area 1513a is wirelessly connectable to the corresponding base station 1512a. While a plurality of UEs 1591, 1592 are illustrated in this example, the disclosed embodiments are equally applicable to a situation where a sole UE is in the coverage area or where a sole UE is connecting to the corresponding base station 1512.

Telecommunication network 1510 is itself connected to host computer 1530, which may be embodied in the hardware and/or software of a standalone server, a cloud-implemented server, a distributed server or as processing resources in a server farm. Host computer 1530 may be under the ownership or control of a service provider, or may be operated by the service provider or on behalf of the service provider. Connections 1521 and 1522 between telecommunication network 1510 and host computer 1530 may extend directly from core network 1514 to host computer 1530 or may go via an optional intermediate network 1520. Intermediate network 1520 may be one of, or a combination of more than one of, a public, private or hosted network; intermediate network 1520, if any, may be a backbone network or the Internet; in particular, intermediate network 1520 may comprise two or more sub-networks (not shown).

The communication system of FIG. 15 as a whole enables connectivity between the connected UEs 1591, 1592 and host computer 1530. The connectivity may be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 may be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Figure 16:
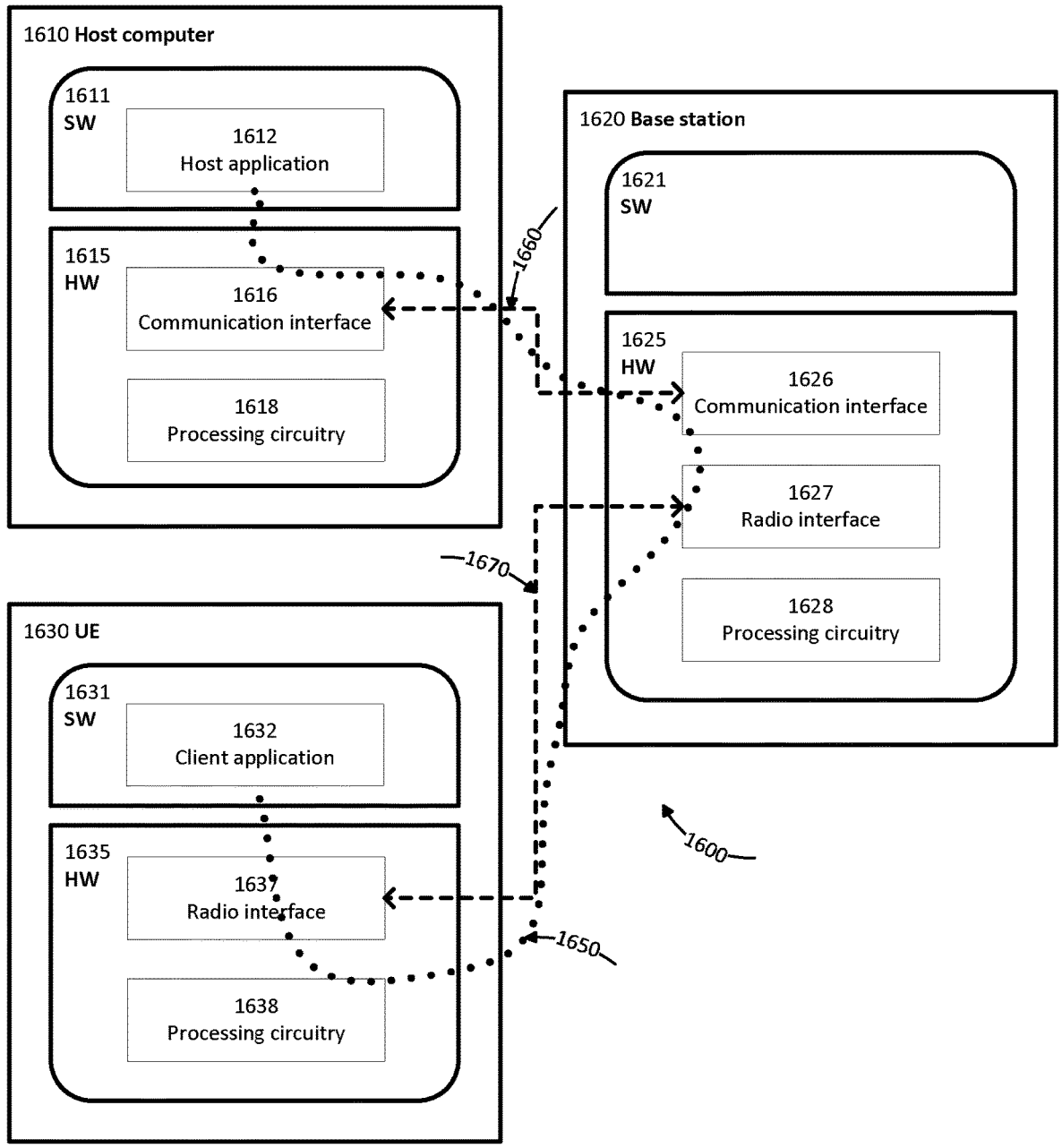
FIG. 16 is a block diagram of a host computer according to some embodiments.

Example implementations, in accordance with an embodiment, of the UE, base station and host computer discussed in the preceding paragraphs will now be described with reference to FIG. 16. FIG. 16 illustrates host computer communicating via a base station with a user equipment over a partially wireless connection in accordance with some embodiments In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which may have storage and/or processing capabilities. In particular, processing circuitry 1618 may comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 may be operable to provide a service to a remote user, such as UE 1630 connecting via OTT connection 1650 terminating at UE 1630 and host computer 1610. In providing the service to the remote user, host application 1612 may provide user data which is transmitted using OTT connection 1650.

Communication system 1600 further includes base station 1620 provided in a telecommunication system and comprising hardware 1625 enabling it to communicate with host computer 1610 and with UE 1630. Hardware 1625 may include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 may be configured to facilitate connection 1660 to host computer 1610. Connection 1660 may be direct or it may pass through a core network (not shown in FIG. 16) of the telecommunication system and/or through one or more intermediate networks outside the telecommunication system. In the embodiment shown, hardware 1625 of base station 1620 further includes processing circuitry 1628, which may comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 further includes UE 1630 already referred to. Its hardware 1635 may include radio interface 1637 configured to set up and maintain wireless connection 1670 with a base station serving a coverage area in which UE 1630 is currently located. Hardware 1635 of UE 1630 further includes processing circuitry 1638, which may comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 may be operable to provide a service to a human or non-human user via UE 1630, with the support of host computer 1610. In host computer 1610, an executing host application 1612 may communicate with the executing client application 1632 via OTT connection 1650 terminating at UE 1630 and host computer 1610. In providing the service to the user, client application 1632 may receive request data from host application 1612 and provide user data in response to the request data. OTT connection 1650 may transfer both the request data and the user data. Client application 1632 may interact with the user to generate the user data that it provides.

It is noted that host computer 1610, base station 1620 and UE 1630 illustrated in FIG. 16 may be similar or identical to host computer 1530, one of base stations 1512a, 1512b, 1512c and one of UEs 1591, 1592 of FIG. 15, respectively. This is to say, the inner workings of these entities may be as shown in FIG. 16 and independently, the surrounding network topology may be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure may determine the routing, which it may be configured to hide from UE 1630 or from the service provider operating host computer 1610, or both. While OTT connection 1650 is active, the network infrastructure may further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the teachings of these embodiments may improve the quality of service (QoS), data rate, and/or latency and thereby provide benefits such as reduced user waiting time, relaxed restriction on file size, and better responsiveness.

A measurement procedure may be provided for the purpose of monitoring data rate, latency and other factors on which the one or more embodiments improve. There may further be an optional network functionality for reconfiguring OTT connection 1650 between host computer 1610 and UE 1630, in response to variations in the measurement results. The measurement procedure and/or the network functionality for reconfiguring OTT connection 1650 may be implemented in software 1611 and hardware 1615 of host computer 1610 or in software 1631 and hardware 1635 of UE 1630, or both. In embodiments, sensors (not shown) may be deployed in or in association with communication devices through which OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of OTT connection 1650 may include message format, retransmission settings, preferred routing etc.; the reconfiguring need not affect base station 1620, and it may be unknown or imperceptible to base station 1620. Such procedures and functionalities may be known and practiced in the art. In certain embodiments, measurements may involve proprietary UE signaling facilitating host computer 1610's measurements of throughput, propagation times, latency and the like. The measurements may be implemented in that software 1611 and 1631 causes messages to be transmitted, in particular empty or 'dummy' messages, using OTT connection 1650 while it monitors propagation times, errors etc.

Figure 17:
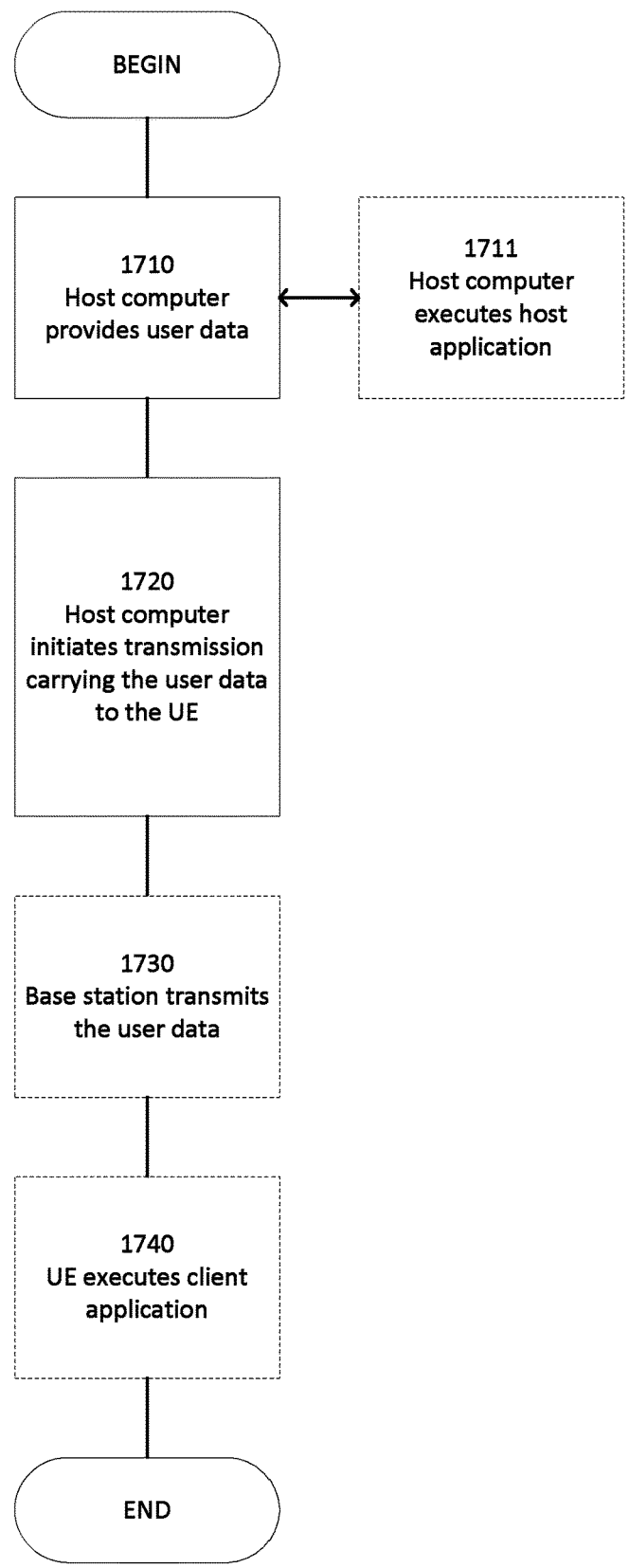
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1710, the host computer provides user data. In substep 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

Figure 18:
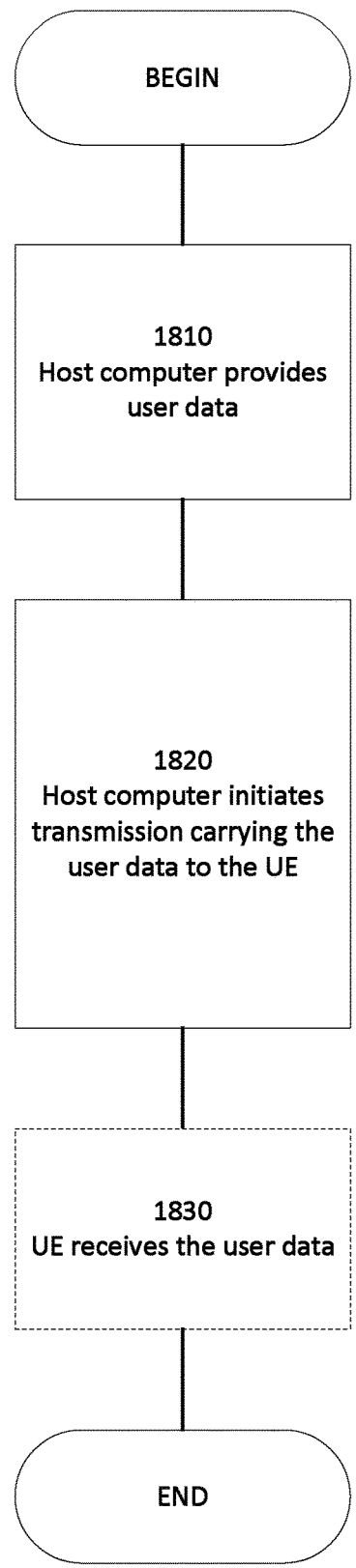
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

Figure 19:
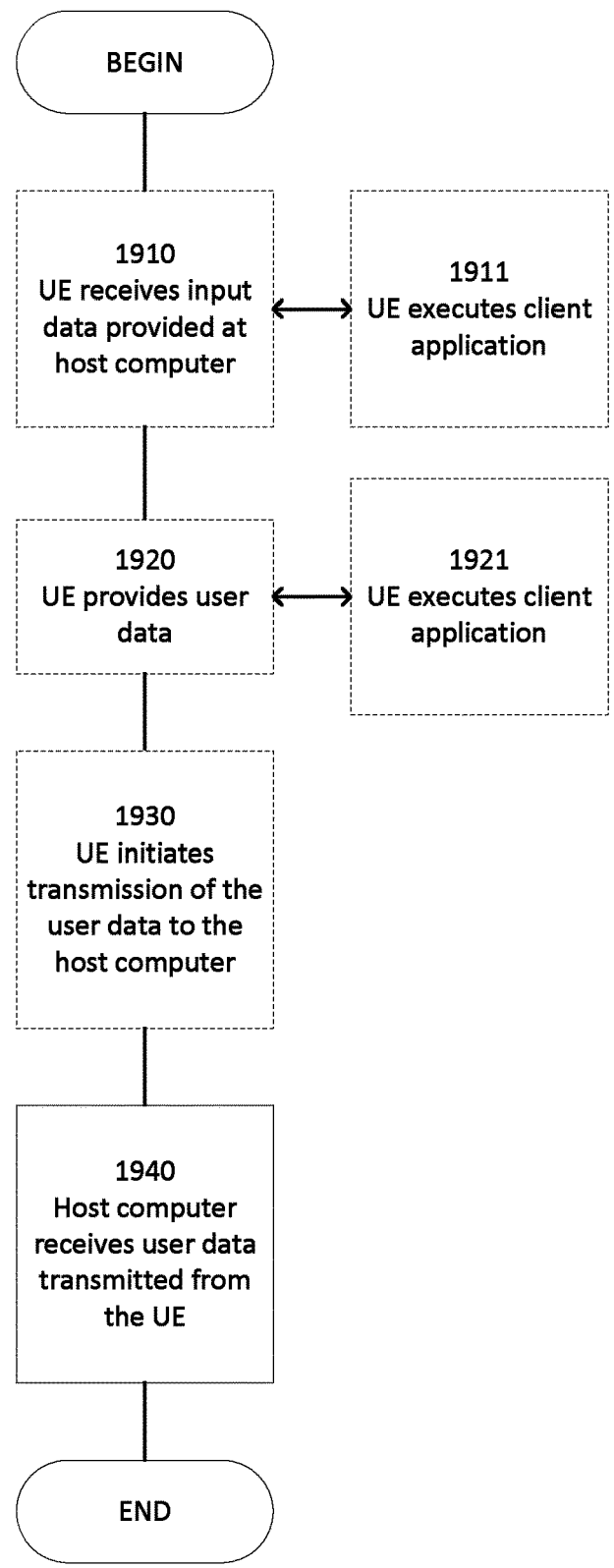
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In substep 1921 (which may be optional) of step 1920, the UE provides the user data by executing a client application. In substep 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in substep 1930 (which may be optional), transmission of the user data to the host computer. In step 1940 of the method, the host computer receives the user data transmitted from the UE, in accordance with the teachings of the embodiments described throughout this disclosure.

Figure 20:
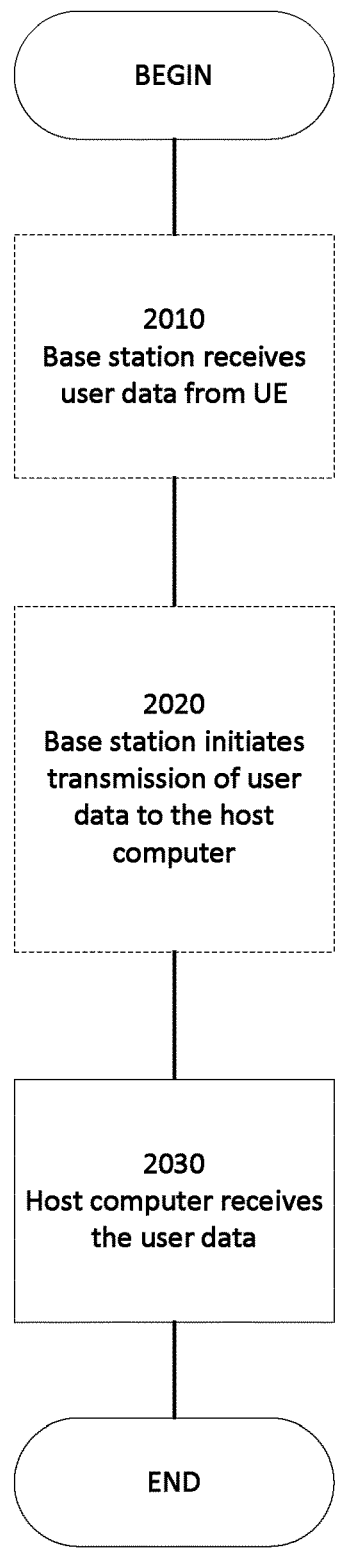
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a radio network node, the method comprising:
  receiving a data block to be transmitted by the radio network node towards a destination node, wherein the data block is received over an upstream wireless backhaul from an upstream radio network node and the data block is to be transmitted towards the destination node over a downstream wireless backhaul to a downstream radio network node;
  receiving from the upstream node control signaling indicating an upstream delay that includes delay incurred up until when the upstream node transmitted the data block to the radio network node;
  determining upstream propagation delay that includes propagation delay between the upstream node and the radio network node;
  determining a self time delay that is a delay between a receive time when the data block passes a receive reference point in a receive chain of the radio network node and a scheduling time when the data block is available to be scheduled by the radio network node for transmission;
  calculating a cumulative time delay as a sum of a least the upstream delay, the upstream propagation delay, and the self time delay;
  calculating the remaining delay budget by subtracting the cumulative time delay from the delay budget;
  determining, based on the self time delay, a remaining delay budget that indicates a remaining portion of a delay budget for the data block to reach the destination node; and
  making a decision about transmission of the data block, based on the remaining delay budget.

2. The method of claim 1, wherein making the decision for the data block comprises deciding, based on the remaining delay budget, one or more of:
  whether to drop the data block;
  a modulation and coding scheme with which to schedule the data block for transmission from the radio network node;
  which one or more transmission resources to allocate for transmission of the data block;
  which of multiple possible routes to the destination node the data block is to be transmitted over;
  whether the data block is to be preempted by, or is to preempt, another data block in a transmit buffer of the radio network node; or
  a priority or timeliness with which the data block is to be transmitted from the radio network node.

3. The method of claim 1, further comprising transmitting the data block from the radio network node in accordance with the decision.

4. The method of claim 1, wherein the decision for the data block is made further based on expected delay that includes delay expected to be incurred after transmitting the data block from the radio network node.

5. The method of claim 4, wherein the expected delay includes one or more of:
  propagation delay expected to be incurred after transmitting the data block from the radio network node; or time duplexing delay expected to be incurred after transmitting the data block from the radio network node, wherein the time duplexing delay includes delay attributable to wireless backhaul transmissions being duplexed in time with access link transmissions.

6. The method of claim 1, further comprising receiving control signaling indicating the upstream propagation delay.

7. A method performed by a radio network node, the method comprising:
receiving a data block to be transmitted by the radio network node towards a destination node, wherein the data block is received over an upstream wireless backhaul from an upstream radio network node and the data block is to be transmitted towards the destination node over a downstream wireless backhaul to a downstream radio network node;
receiving from the upstream node control signaling indicating an upstream delay that includes delay incurred between the reference time and a time when the upstream node transmitted the data block to the radio network node;
determining upstream propagation delay that includes propagation delay between the upstream node and the radio network node;
determining a self time delay that is a delay between a receive time when the data block passes a receive reference point in a receive chain of the radio network node and a transmit time when the data block passes a transmit reference point in a transmit chain of the radio network node;
calculating the time delay as a sum of at least the indicated upstream delay, the upstream propagation delay, and the self time delay;
determining, based on the self time delay, a time delay between a reference time and the transmit time;
transmitting the data block from the radio network node towards the destination node; and
transmitting towards the destination node control signaling that indicates the time delay.

8. The method of claim 7, wherein the control signaling also indicates a delay budget for the data block to reach the destination node.

9. The method of claim 7, wherein the reference time is a time from which a delay budget for the data block to reach the destination node is measured.

10. The method of claim 7, wherein the reference time is a receive time when the data block passes a receive reference point in a receive chain of the radio network node.

11. The method of claim 7, further comprising: receiving control signaling indicating the upstream propagation delay.

12. The method of claim 8, wherein the data block is a packet, and wherein the delay budget is a packet delay budget (PDB).

13. The method of claim 7, wherein the data block is a transport block that carries data from one or more packets.

14. The method of claim 7, further comprising receiving control signaling indicating the delay budget.

15. The method of claim 7, wherein the radio network node is an integrated access backhaul (IAB) node in a New Radio wireless communication system.

16. A radio network node configured to:
receive a data block to be transmitted by the radio network node towards a destination node, wherein the data block is received over an upstream wireless backhaul from an upstream radio network node and the data block is to be transmitted towards the destination node over a downstream wireless backhaul to a downstream radio network node;
receive from the upstream node control signaling indicating an upstream delay that includes delay incurred between the reference time and a time when the upstream node transmitted the data block to the radio network node;
determine upstream propagation delay that includes propagation delay between the upstream node and the radio network node;
determine a self time delay that is a delay between a receive time when the data block passes a receive reference point in a receive chain of the radio network node and a scheduling time when the data block is available to be scheduled by the radio network node for transmission;
calculate the time delay as a sum of at least the indicated upstream delay, the upstream propagation delay, and the self time delay;
determine, based on the self time delay, a remaining delay budget that indicates a remaining portion of a delay budget for the data block to reach the destination node; and
make a decision about transmission of the data block, based on the remaining delay budget.

17. A radio network node configured to:
receive a data block to be transmitted by the radio network node towards a destination node, wherein the data block is received over an upstream wireless backhaul from an upstream radio network node and the data block is to be transmitted towards the destination node over a downstream wireless backhaul to a downstream radio network node;
receive from the upstream node control signaling indicating an upstream delay that includes delay incurred up until when the upstream node transmitted the data block to the radio network node;
determine upstream propagation delay that includes propagation delay between the upstream node and the radio network node;
determine a self time delay that is a delay between a receive time when the data block passes a receive reference point in a receive chain of the radio network node and a transmit time when the data block passes a transmit reference point in a transmit chain of the radio network node;
calculate a cumulative time delay as a sum of a least the upstream delay, the upstream propagation delay, and the self time delay;
calculate the remaining delay budget by subtracting the cumulative time delay from the delay budget;
determine, based on the self time delay, a time delay between a reference time and the transmit time;
transmit the data block from the radio network node towards the destination node; and
transmit towards the destination node control signaling that indicates the time delay.

* * * * *